US011063626B2

(12) United States Patent
Luo et al.

(10) Patent No.: US 11,063,626 B2
(45) Date of Patent: Jul. 13, 2021

(54) PROTECTIVE CASE FOR MOBILE TERMINAL AND ELECTRONIC DEVICE

(71) Applicant: Guangdong OPPO Mobile Telecommunications Corp., Ltd., Guangdong (CN)

(72) Inventors: Yuanli Luo, Guangdong (CN); Yanrong She, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 65 days.

(21) Appl. No.: 16/438,761

(22) Filed: Jun. 12, 2019

(65) Prior Publication Data

US 2019/0386696 A1 Dec. 19, 2019

(30) Foreign Application Priority Data

Jun. 15, 2018 (CN) .......................... 201820937735.0
Jun. 15, 2018 (CN) .......................... 201820939664.8

(51) Int. Cl.
*H04M 1/02* (2006.01)
*H04B 1/3888* (2015.01)
*A45C 11/00* (2006.01)

(52) U.S. Cl.
CPC ............ *H04B 1/3888* (2013.01); *A45C 11/00* (2013.01); *H04M 1/0237* (2013.01); *A45C 2011/002* (2013.01); *A45C 2011/003* (2013.01)

(58) Field of Classification Search
CPC ........... H45C 2011/002; G06F 1/1679; H04M 1/0249; H04M 1/0237; H04B 1/3888;

(Continued)

(56) References Cited

U.S. PATENT DOCUMENTS 9,634,712 B1* 4/2017 Deng .................... H04B 1/3888
2005/0106910 A1* 5/2005 Chiu ..................... H01R 12/714
439/136

(Continued)

FOREIGN PATENT DOCUMENTS

CN 202311761 U 7/2012
CN 202566751 U 12/2012

(Continued)

OTHER PUBLICATIONS

International search report issued in corresponding international application No. PCT/CN2019/091057, dated Aug. 27, 2019 (4 pages).

(Continued)

*Primary Examiner* — Rafael Pérez-Gutiérrez
*Assistant Examiner* — Xiang Zhang

(57) ABSTRACT

A protective case for a mobile terminal is disclosed. The protective case for a mobile terminal includes a first shell and a second shell. The first shell has a body portion and a rim portion. The rim portion is fixed to a periphery of the body portion. The first shell is made of Kevlar, and the second shell is made of polyurethane a strength less than a strength of material of the first shell. The second shell is fixed to an inner side of the rim portion that faces towards the body portion, such that a receiving space configured to receive the mobile terminal is defined by the first shell and the second shell.

20 Claims, 13 Drawing Sheets

(58) Field of Classification Search
CPC .... A45C 11/00; H05K 5/0234; H05K 5/0204; H05K 5/03; F16M 13/005; H01H 9/0264
See application file for complete search history.

(56) References Cited

U.S. PATENT DOCUMENTS

| | | | | |
|---|---|---|---|---|
| 2009/0149230 | A1* | 6/2009 | Ruan | H04M 1/0237 455/575.4 |
| 2011/0292578 | A1* | 12/2011 | Lim | H04M 1/0239 361/679.01 |
| 2012/0162876 | A1* | 6/2012 | Kim | H04M 1/0237 361/679.01 |
| 2016/0020810 | A1* | 1/2016 | Platt | H04B 1/3888 455/556.1 |
| 2016/0204817 | A1* | 7/2016 | Kim | H04B 1/3888 455/575.8 |
| 2017/0338844 | A1 | 11/2017 | Fathollahi | |

FOREIGN PATENT DOCUMENTS

| | | |
|---|---|---|
| CN | 202634513 U | 12/2012 |
| CN | 203027306 U | 6/2013 |
| CN | 203087905 U | 7/2013 |
| CN | 203279970 U | 11/2013 |
| CN | 204291069 U | 4/2015 |
| CN | 204669426 U | 9/2015 |
| CN | 204810341 U | 11/2015 |
| CN | 205030010 U | 2/2016 |
| CN | 205105262 U | 3/2016 |
| CN | 105554196 A | 5/2016 |
| CN | 206226544 U | 6/2017 |
| CN | 207070150 U | 3/2018 |
| CN | 208227130 U | 12/2018 |
| CN | 208890878 U | 5/2019 |
| DE | 102015002004 A1 | 8/2016 |
| KR | 20140029844 A | 3/2014 |

OTHER PUBLICATIONS

European search report issued in corresponding European application No. EP19180206, dated Oct. 30, 2019 (9 pages).
Indian Examination Report for IN Application 201914023604 dated Feb. 12, 2021. (5 pages).

* cited by examiner

PROTECTIVE CASE FOR MOBILE TERMINAL AND ELECTRONIC DEVICE

CROSS-REFERENCE TO RELATED APPLICATION(S)

This application claims priorities to Chinese Patent Application No. 201820939664.8, filed on Jun. 15, 2018, and Chinese Patent Application No. 201820937735.0, filed on Jun. 15, 2018, the contents of both of which are herein incorporated by reference in their entireties.

TECHNICAL FIELD

The present disclosure relates to protection technologies for mobile terminals, and in particular, to a protective case for a mobile terminal and an electronic device.

BACKGROUND

At present, in a protective case for a mobile phone, side plates of the mobile phone are all wrapped by the protective case. When the protective case having this design is applied to a new type of mobile phone having a sliding structure, a user needs to frequently remove the protective case of the mobile phone to meet sliding requirements of the sliding structure. Thus, it is very inconvenient to use the protective case.

SUMMARY

In one aspect, a protective case for a mobile terminal is provided in some embodiments of the present disclosure. The protective case for a mobile terminal comprises a first shell and a second shell. The first shell has a body portion and a rim portion. The rim portion is fixed to a periphery of the body portion. The first shell is made of Kevlar, and the second shell is made of polyurethane having a strength less than a strength of material of the first shell. The second shell is fixed to an inner side of the rim portion that faces towards the body portion, such that a receiving space configured to receive the mobile terminal is defined by the first shell and the second shell.

In another aspect, a protective case for a mobile terminal is provided in some embodiments of the present disclosure. The protective case for a mobile terminal comprises a front end face, a rear end face opposite to the front end face, a left end face, a right end face disposed opposite to the left end face, a top end face, and a bottom end face disposed opposite to the top end face. Each of the left end face and the right end face is located between the top end face and the bottom end face; each of the top end face and the bottom end face is located between the left end face and the right end face. The protective case comprises a first shell made of KEVLAR and a second shell made of TPU. The first shell comprises a body portion and a first rim portion and a second rim portion, disposed opposite to each other and connected to the body portion. The body portion is located between the first rim portion and the second rim portion; the body portion, the first rim portion, and the second rim portion cooperatively define a receiving space configured to receive the mobile terminal. The second shell is disposed at sides of the first and second rim portions that face towards the receiving space. After the mobile terminal is disposed into the receiving space, the first rim portion is attached to the left end face, the second rim portion is attached to the right end face, and the body portion is attached to the rear end face.

In a further aspect, an electronic device is provided in some embodiments of the present disclosure. The electronic device comprises a mobile terminal and a protective case for the mobile terminal. The protective case is capable of being detachably sleeved at an outer side of the mobile terminal. The mobile terminal comprises a middle frame and a slider. The middle frame comprises a pair of side end faces and a top end face connected between the pair of side end faces. The top end face defines a receiving groove penetrating through the pair of side end faces. The slider is slidable relative to the middle frame, such that the slider is capable of extending out of or retracting into the receiving groove. The first shell has a body portion and a rim portion. The rim portion is fixed to a periphery of the body portion. The first shell is made of Kevlar, and the second shell is made of polyurethane having a strength less than a strength of material of the first shell. The second shell is fixed to an inner side of the rim portion that faces towards the body portion, such that a receiving space configured to receive the mobile terminal is defined by the first shell and the second shell. When the protective case is sleeved at the outer side of the mobile terminal, the second shell is located between the rim portion and the mobile terminal; the slider is slidable to extend out of the receiving space or retract into the receiving space.

BRIEF DESCRIPTION OF DRAWINGS

In order to more clearly illustrate the technical solutions of the present disclosure, the drawings to be used in the embodiments will be briefly described below. It is obvious that the drawings in the following description are only some embodiments of the present disclosure. For those skilled in the art, other drawings can be obtained based on these drawings without paying any creative effort.

DETAILED DESCRIPTION

Figure 1:
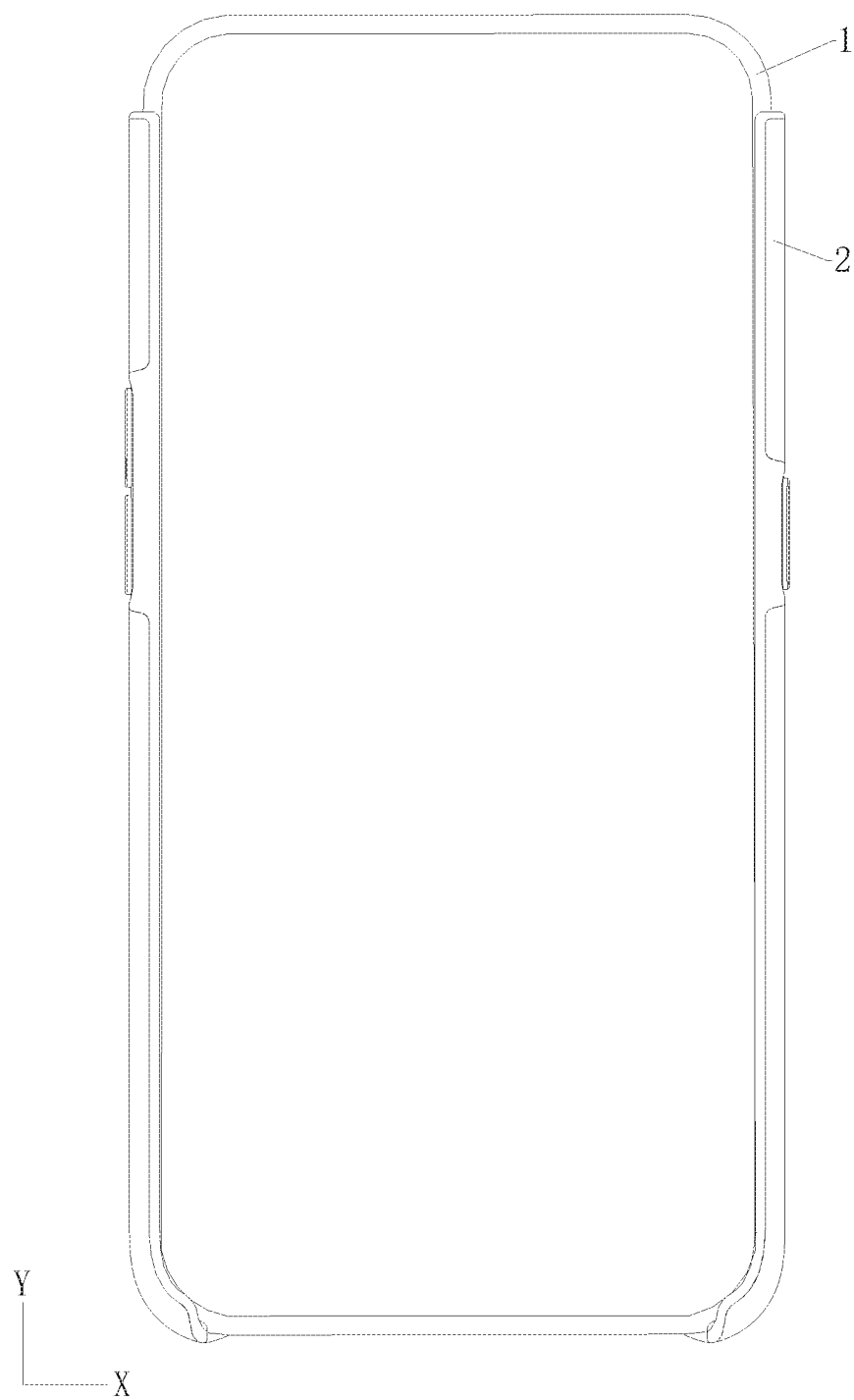
FIG. 1 is a schematic structural view of an electronic device according to some embodiments of the present disclosure.

The technical solutions in the embodiments of the present disclosure will be described below with reference to the drawings in drawings in the embodiments of the present disclosure. Apparently, the embodiments described herein are only some exemplary embodiments, not all the embodiments. Based on the embodiments described in the present disclosure, those skilled in the art may acquire all other embodiments without any creative efforts. All these shall be covered within the protection scope of the present disclosure.

Furthermore, in the description of the embodiments of the present disclosure, the description of the following embodiments is provided with reference to the accompanying drawings for illustrating specific implementations which may be implemented in the present disclosure. Directional terms recited in the present disclosure, such as "top", "bottom", "front", "rear", "left", "right", "inner", "outer", "side", and the like, refer to the orientations in the accompanying drawings. Thus, the directional terms used here are only for better and more clearly describing and understanding the present disclosure, and are not intended to indicate or imply that the devices or the elements are disposed to locate at the specific directions or are structured and performed in the specific directions, which could not to be understood as limiting the present disclosure.

In the present disclosure, it should be noted that, unless specified or limited, otherwise, terms "mounted", "connected", "connected", "disposed", and the like are used in a broad sense, and may include, for example, fixed connections, detachable connections, or integral connections; may also be mechanical or electrical connections; may also be direct connections or indirect connections via intervening structures; may also be inner communications of two elements, as can be understood by those skilled in the art depending on specific contexts.

In the description of the present disclosure, it should be noted that, "a plurality of" means two or more, unless specified otherwise. If the term "process" appears in this specification, it means not only an independent process, but also when it is not clearly distinguishable from other processes, it is included in the term as long as the intended function of the process can be realized. In addition, the numerical range represented by "to" in the present disclosure is a range in which the numerical values described before and after "to" are respectively included as a minimum value and a maximum value. In the drawings, elements that are similar or identical in structure are denoted by the same reference numerals.

In one aspect, a protective case for a mobile terminal is provided in some embodiments of the present disclosure. The protective case for a mobile terminal comprises a first shell and a second shell. The first shell has a body portion and a rim portion. The rim portion is fixed to a periphery of the body portion. The first shell is made of Kevlar, and the second shell is made of polyurethane having a strength less than a strength of material of the first shell. The second shell is fixed to an inner side of the rim portion that faces towards the body portion, such that a receiving space configured to receive the mobile terminal is defined by the first shell and the second shell.

In some embodiments, the rim portion defines a notch; a part of the second shell is embedded in the notch to form a button portion, and a cap is arranged on the button portion and disposed corresponding to a button of the mobile terminal; the cap protrudes out of the notch. A recess is defined in the cap and recessed from a side of the second shell that faces towards the receiving space to another side of the second shell that faces away from the receiving space; the recess has a configuration matching with that of the button.

In some embodiments, the button portion has a first outer surface facing away from the receiving space, and the rim portion has a second outer surface facing away from the receiving space; the first outer surface is spliced with the second outer surface.

In some embodiments, the rim portion has an outer peripheral edge that is disconnected to the body portion, and the second shell wraps the outer peripheral edge.

In some embodiments, the periphery of the body portion includes: a first straight edge, connected to the rim portion; a second straight edge, disposed opposite to the second straight edge and connected to the rim portion; and a first transitional curved edge, disconnected to the rim portion; a first edge, disconnected to the rim portion; and a second transitional curved edge, disconnected to the rim portion; wherein the first straight edge, the first transitional curved edge, the first edge, the second transitional curved edge, and the second straight edge are connected one after another; a line connecting two end points of the first edge is substantially perpendicular to the first straight edge or the second straight edge.

In some embodiments, the periphery of the body portion further comprises: a second edge, disposed opposite to the first edge, wherein a line connecting two end points of the second edge is substantially perpendicular to the first straight edge or the second straight edge; a third transitional curved edge, connected between the first straight edge and the second edge, and disconnected to the rim portion; and a fourth transitional curved edge, connected between the second straight edge and the second edge, and disconnected to the rim portion.

In some embodiments, the first edge comprises a central region and two edge regions connected to two opposite ends of the central region; the central region is recessed in a direction towards a middle of the body portion with respect to the two edge regions.

In some embodiments, the second shell has a first end portion and a second end portion opposite to the first end portion; a distance from the first end portion to the first edge is shorter than a distance from the second end portion to the first edge. A clearance groove is defined in the second shell at a position corresponding to an insulating portion of the mobile terminal, and the clearance groove extends through an edge of the first end portion.

In another aspect, a protective case for a mobile terminal is provided in some embodiments of the present disclosure. The protective case for a mobile terminal comprises a front end face, a rear end face opposite to the front end face, a left end face, a right end face disposed opposite to the left end face, a top end face, and a bottom end face disposed opposite to the top end face. Each of the left end face and the right end face is located between the top end face and the bottom end face; each of the top end face and the bottom end face is located between the left end face and the right end face.

The protective case comprises a first shell made of KEVLAR and a second shell made of TPU. The first shell comprises a body portion and a first rim portion and a second rim portion, disposed opposite to each other and connected to the body portion. The body portion is located between the first rim portion and the second rim portion; the body portion, the first rim portion, and the second rim portion cooperatively define a receiving space configured to receive the mobile terminal. The second shell is disposed at sides of the first and second rim portions that face towards the receiving space. After the mobile terminal is disposed into the receiving space, the first rim portion is attached to the left end face, the second rim portion is attached to the right end face, and the body portion is attached to the rear end face.

In some embodiments, at least one of the first rim portion and the second rim portion defines a notch at a position corresponding to a button of the mobile terminal, and the second shell comprises a cap protruding out of the notch; the cap is disposed corresponding to the button. A recess is defined in the cap and recessed from one side of the second shell that faces towards the receiving space to another side of the second shell that faces away from the receiving space; the recess has a configuration matching with that of the button.

In some embodiments, the body portion comprises: a top end portion; a bottom end portion, disposed opposite to the top end portion; a left end portion, connected between the top end portion and the bottom portion; and a right end portion, disposed opposite to the left end portion, and connected between the top end portion and the bottom end portion; wherein the first rim portion is connected to the left end portion, and the second rim portion is connected to the right end portion; the top end portion protrudes outwardly from one ends of the first rim portion and the second rim portion, such that a first opening is defined in the top end portion; the other end of the first rim portion and the other end of the second rim portion extend towards to each other along the bottom end portion, such that a second opening is defined in the bottom end portion.

In some embodiments, a maximum width of the first opening in a width direction of the protective case is greater than a maximum width of the second opening in the width direction of the protective case In some embodiments, the second shell wraps both an edge of the first rim portion and an edge of the second rim portion.

In some embodiments, the second shell has a first end portion and a second end portion; a distance from the first end portion to the top end portion is shorter than a distance from the second end portion to the top end portion. A clearance groove is defined in the second shell at a position corresponding to an insulating portion of the mobile terminal, and the clearance groove extends through an edge of the first end portion.

In some embodiments, the body portion comprises a front end surface and a rear end surface opposite to the front end surface; a transmission area configured to expose a camera of the mobile terminal extends through the front end surface and the rear end surface, and further extends through an edge of the top end portion that is away from the bottom end portion In a further aspect, an electronic device is provided in some embodiments of the present disclosure. The electronic device comprises a mobile terminal and a protective case for the mobile terminal. The protective case is capable of being detachably sleeved at an outer side of the mobile terminal. The mobile terminal comprises a middle frame and a slider. The middle frame comprises a pair of side end faces and a top end face connected between the pair of side end faces. The top end face defines a receiving groove penetrating through the pair of side end faces. The slider is slidable relative to the middle frame, such that the slider is capable of extending out of or retracting into the receiving groove. The first shell has a body portion and a rim portion. The rim portion is fixed to a periphery of the body portion. The first shell is made of Kevlar, and the second shell is made of polyurethane having a strength less than a strength of material of the first shell. The second shell is fixed to an inner side of the rim portion that faces towards the body portion, such that a receiving space configured to receive the mobile terminal is defined by the first shell and the second shell. When the protective case is sleeved at the outer side of the mobile terminal, the second shell is located between the rim portion and the mobile terminal; the slider is slidable to extend out of the receiving space or retract into the receiving space.

In some embodiments, the rim portion defines a notch; a part of the second shell is embedded in the notch to form a button portion, and a cap is arranged on the button portion and disposed corresponding to a button of the mobile terminal; the cap protrudes out of the notch. A recess is defined in the cap and recessed from a side of the second shell that faces towards the receiving space to another side of the second shell that faces away from the receiving space; the recess has a configuration matching with that of the button; when the protective case is sleeved at the outer side of the mobile terminal, the cap warps the button.

In some embodiments, the button portion has a first outer surface facing away from the receiving space, and the rim portion has a second outer surface facing away from the receiving space; the first outer surface is spliced with the second outer surface. The rim portion has an outer peripheral edge that is disconnected to the body portion, and the second shell wraps the outer peripheral edge.

In some embodiments, the body portion has a periphery comprising: a first straight edge, connected to the rim portion, a second straight edge, disposed opposite to the second straight edge and connected to the rim portion; and a first transitional curved edge, disconnected to the rim portion; a first edge, disconnected to the rim portion; and a second transitional curved edge, disconnected to the rim portion; wherein the first straight edge, the first transitional curved edge, the first edge, the second transitional curved edge, and the second straight edge are connected one after another; a second edge, disposed opposite to the first edge, wherein a line connecting two end points of the second edge is substantially perpendicular to the first straight edge or the second straight edge; a third transitional curved edge, connected between the first straight edge and the second edge, and disconnected to the rim portion; and a fourth transitional curved edge, connected between the second straight edge and the second edge, and disconnected to the rim portion. A line connecting two end points of the first edge is substantially perpendicular to the first straight edge or the second straight edge. When the protective case is sleeved at the outer side of the mobile terminal, a portion of the rim portion that is connected to the first straight edge is attached to the left end face, a portion of the rim portion that is connected to the second straight edge is attached to the right end face, a portion of the rim portion that is connected to the third transitional curved edge is attached to the mobile terminal, and a portion of the side plate that is connected to the fourth transitional curved edge is attached to the mobile terminal;

the slider is slidable relative to the first edge, the first transitional curved edge, and the second transitional curved edge.

In some embodiments, the mobile terminal comprises a rear cover fixed to the middle frame, and the rear cover has a top edge facing towards the top end face; the top edge comprises an intermediate portion and two edge portions connected to two opposite ends of the intermediate portion; the intermediate portion is recessed in a direction toward a middle of the rear cover relative to the two edge portions; the first edge of the protective case has a shape matching with that of the top edge.

Figure 2:
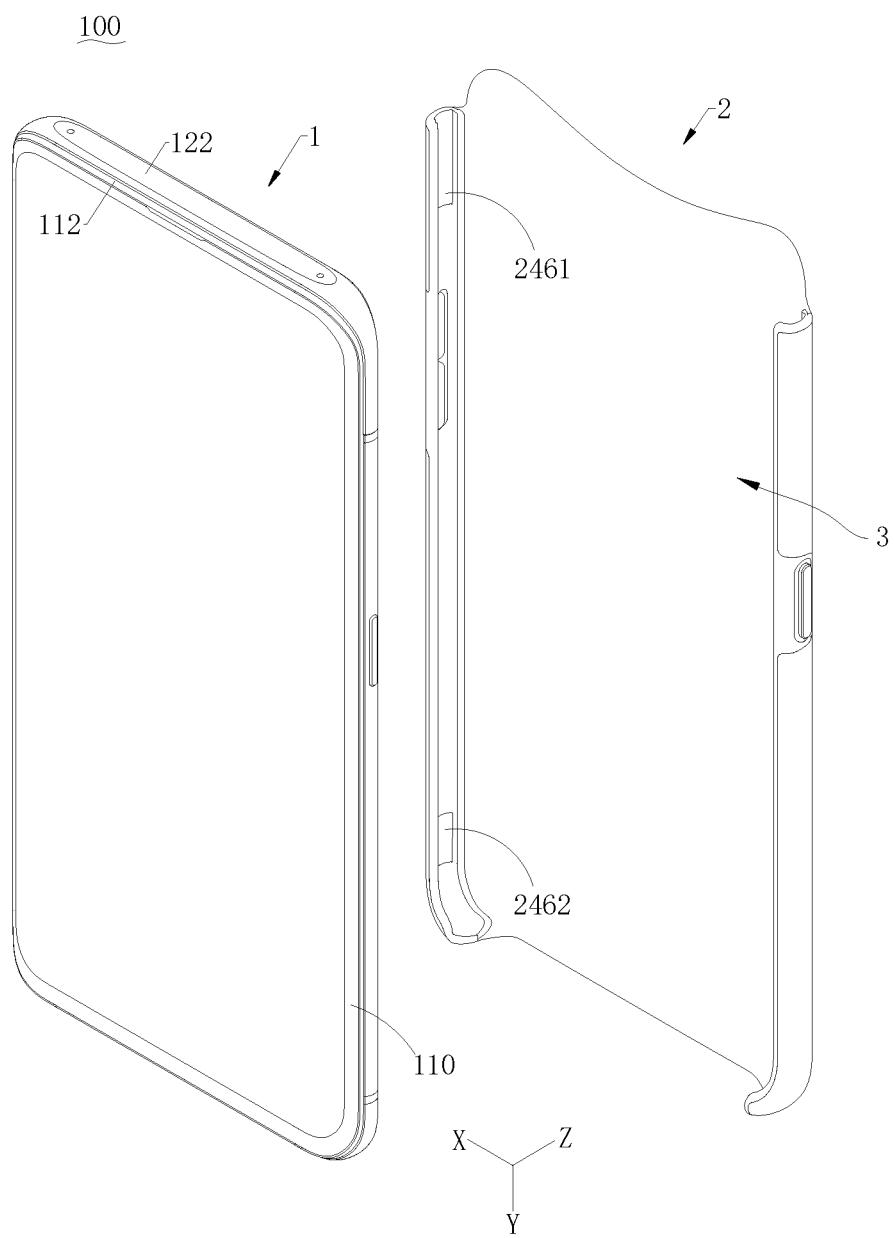
FIG. 2 is a schematic structural view of the electronic device shown in FIG. 1, wherein the electronic device is in another use state.

As shown in FIG. 1 and FIG. 2, FIG. 1 is a schematic structural view of an electronic device 100 according to some embodiments of the present disclosure; FIG. 2 is a schematic structural view of the electronic device 100 shown in FIG. 1, wherein the electronic device is in another use state.

The electronic device 100 may include a mobile terminal 1 and a protective case 2 for the mobile terminal 1. The protective case 2 may be capable of being detachably sleeved at an outer side of the mobile terminal 1. The protective case 2 may have a shape matching with that of an outer contour of the mobile terminal 1, such that the protective case 2 may be better sleeved on the mobile terminal 1.

In some embodiments, when the protective case 2 is sleeved on the mobile terminal 1, the mobile terminal 1 may be protected, and the risk that the mobile terminal 1 is worn or cracked may be reduced. The protective case 2 may also be detached from the mobile terminal 1 according to user requirements.

For convenience of description, the mobile terminal 1 may be defined with reference to the viewed angle shown in FIG. 2. As shown in FIG. 2, the mobile terminal 1 may have a width direction X, a length direction Y, and a thickness direction Z. The length direction Y may be substantially perpendicular to the width direction X, and the thickness direction Z may be substantially perpendicular to the width direction X and the length direction Y. Since the protective case 2 may be sleeved on the mobile terminal 1, a length direction of the protective case 2 may be the direction in which the length direction Y of the mobile terminal 1 is located, the width direction of the protective case 2 may be the direction in which the width direction X of the mobile terminal 1 is located, and the thickness direction of the protective case 2 may be the direction in which the thickness direction Z of the mobile terminal 1 is located. As shown in FIG. 1, the length direction of the electronic device 100 may be the direction in which the length direction Y of the mobile terminal 1 is located, the width direction of the electronic device 100 may be the direction in which the width direction X of the mobile terminal 1 is located, and the thickness direction of the electronic device 100 may be the direction in which the thickness direction Z of the terminal 1 is located.

In the present disclosure, a communication terminal configured to communicate via a wireless interface may be referred to as a "wireless communication terminal", a "wireless terminal", or a "mobile terminal". Wireless interface methods include, but are not limited to, a cellular network, a wireless local area network (WLAN), a digital television network such as DVB-H network, a satellite network, an AM-FM broadcast transmitter, and the like. Examples of the mobile terminal 1 may include, but be not limited to, the following electronic device 100: (1) a satellite phone or a cellular phone; (2) a personal communication system (PCS) terminal that can combine cellular radiotelephone with data processing, fax, and data communication capabilities; (3) a radiotelephone, a pager, an internet/intranet access, a web browser, a notepad, a calendar, and a personal digital assistant (PDA) equipped with global positioning system (GPS) receiver; (4) a conventional laptop and/or a palmtop receiver; (5) a conventional laptop and/or palmtop radiotelephone transceiver, and the like.

Figure 3:
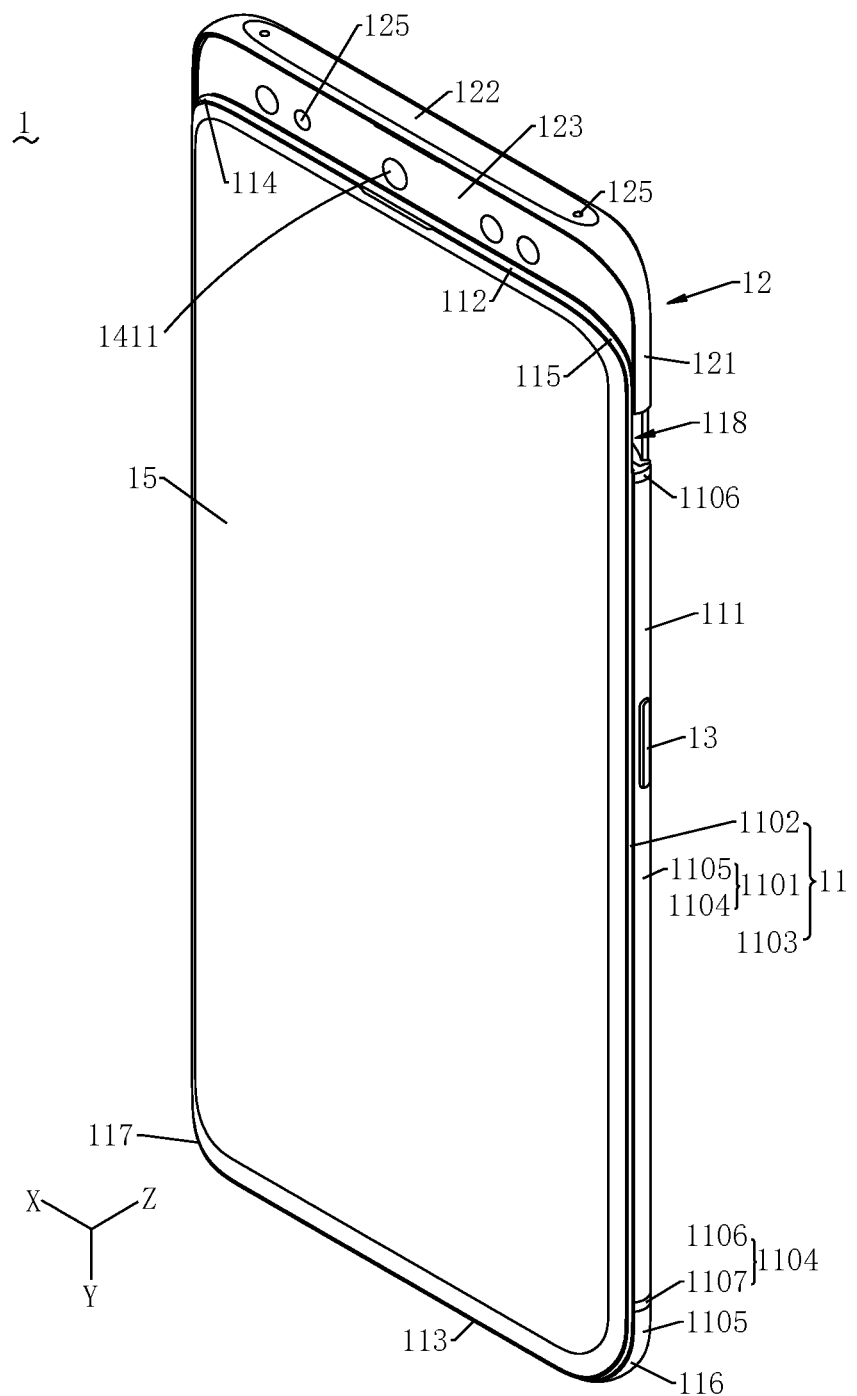
FIG. 3 is a schematic structural view of a mobile terminal shown in FIG. 2 in another use state.
Figure 4:
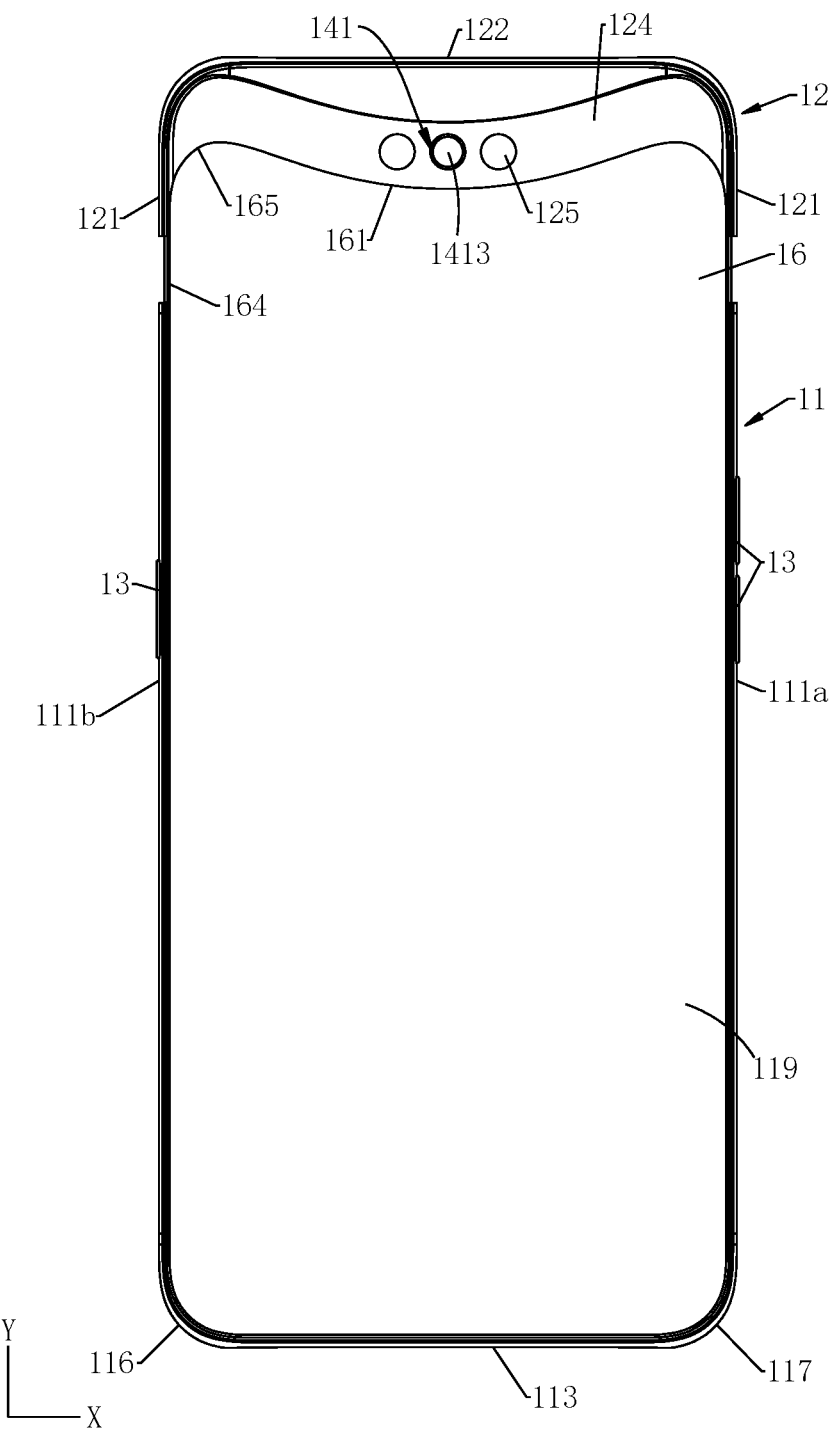
FIG. 4 is a schematic structural view of the mobile terminal shown in FIG. 3, but viewed from another angle.
Figure 5:
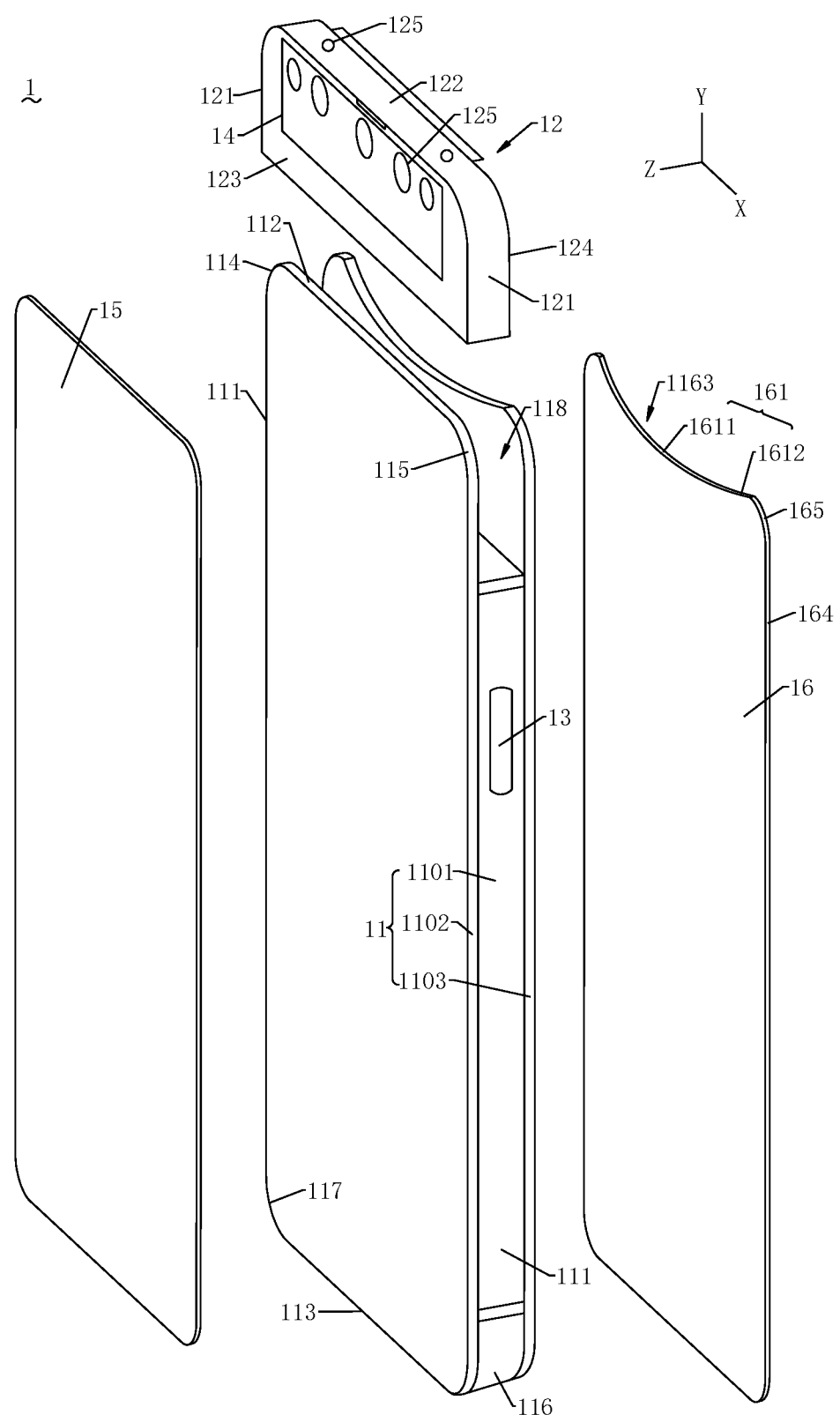
FIG. 5 is an exploded view of the mobile terminal shown in FIG. 3.

As shown in FIGS. 3-5, FIG. 3 is a schematic structural view of a mobile terminal 1 shown in FIG. 2 in another use state, FIG. 4 is a schematic structural view of the mobile terminal 1 shown in FIG. 3, but viewed from another angle, and FIG. 5 is an exploded view of the mobile terminal 1 shown in FIG. 3.

The mobile terminal 1 may include a middle frame 11 and a slider 12. The slider 12 may be slidable relative to the middle frame 11.

The middle frame 11 may include a pair of side end faces 111 and a top end face 112 connected between the pair of side end faces 111. The middle frame 11 may also include a bottom end face 113. The bottom end face 113 may be disposed opposite to the top end face 112, and connected between the pair of side end faces 111. A button 13 may be provided on at least one of the side end faces 111 of the mobile terminal 1. The button 13 may be a power button, a volume button, and the like. At least one of a main board, a battery, a speaker, a microphone, and an electrical connector may be disposed inside the middle frame 11 of the mobile terminal 1. The bottom end face 113 may define one or more of a sound-output hole corresponding to the speaker, a sound-input hole corresponding to the microphone, and a connecting through-hole corresponding to the electrical connector.

In some embodiments, as shown in FIG. 4, the side end faces 111 may include a left end face 111a and a right end face 111b disposed opposite to the left end face 111a. The left end face 111a may be disposed between the top end face 112 and the bottom end face 113. The right end face 111b may be disposed between the top end face 112 and the bottom end face 113. The top end face 112 may be disposed between the left end face 111a and the right end face 111b. The bottom end face 113 may be disposed between the left end face 111a and the right end face 111b. Further, in some embodiments, the mobile terminal 1 may be substantially in shape of a rectangular block. The left end face 111a and the right end face 111b may be respectively disposed at two opposite ends in a width direction of the rectangular block.

In some embodiments, the middle frame 11 may also include a front end face 110, and a rear end face 119 opposite to the front end face 110. Each of the front end face 110 and the rear end face 119 may be connected to the side end faces 111 (including the left end face 111a and the right end face 111b).

The middle frame 11 may further include a first transitional curved surface 114, a second transitional curved surface 115, a third transitional curved surface 116, and a fourth transitional curved surface 117. In some embodiments, the curved surfaces 114, 115, 116, and 117 may be in shape of an arc. The first transitional curved surface 114 may be connected between the top end face 112 and one of the pair of side end faces 111. The second transitional curved surface 115 may be connected between the top end face 112 and the other of the pair of side end faces 111. The third transitional curved surface 116 may be connected between the bottom end face 113 and one of the pair of side end faces 111. The fourth transitional curved surface 117 may be connected between the bottom end face 113 and the other of the pair of side end faces 111.

The top end face 112 may define a receiving groove 118. The receiving groove 118 may penetrate through the pair of side end faces 111. That is, the receiving groove 118 may extend from one of the pair of side end faces 111 (for example, the left end face 111a) to the other of the pair of side end faces 111 (for example, the right end face 111b). The receiving groove 118 may also extend to the first transitional curved surface 114 and the second transitional curved surface 115. The slider 12 may be slidable relative to the middle frame 11, such that the slider 12 may extend out of or retract into the receiving groove 118. In other words, the slider 12 may be slidable in the receiving groove 118 and relative to the middle frame 11. In the present disclosure, the slider 12 may be movable in the length direction Y of the mobile terminal 1.

The slider 12 may include a pair of side surfaces 121 and a top surface 122 connected between the pair of side surfaces 121, and may be switchable between a first position and a second position. In some embodiments, when the slider 12 retracts into the receiving groove 118, one of the pair of side surfaces 121 may be spliced with one of the pair of side end faces 111, the other of the pair of side surfaces 121 may be spliced with the other of the pair of side end faces 111, and the top surface 122 may be spliced with the top end face 112. When the slider 12 extends out of the receiving groove 118, the top surface 122 may protrude relative to the top end face 112.

In the present disclosure, as shown in FIG. 3, when the top surface 122 of the slider 12 protrudes to a certain distance relative to the top end face 112 of the middle frame 11, it may be defined that the slider 12 completely extends out of the receiving groove 118 of the middle frame 11. In other words, the slider 12 is in an extension state. At this time, the slider 12 is in the second position. As shown in FIG. 2, when the top surface 122 of the slider 12 is spliced with the top end face 112 of the middle frame 11, it may be defined that the slider 12 is completely received in the receiving groove 118 of the middle frame 11. In other words, the slider 12 is in a retraction state. At this time, the slider 12 is first position.

As shown in FIG. 5, an electronic assembly 14 may be disposed in the slider 12. The electronic assembly 14 may include one or more devices or modules. The devices or modules may include, but be not limited to, a camera module, a face recognition module, an iris recognition module, a receiver (also called as an earpiece), a microphone, an antenna module, a light sensor module, and a light sensor. The camera module may be configured for shooting (taking photos or videos). The face recognition module may be configured to acquire a depth image of colors of a user's face. The iris recognition module may be configured to acquire an iris image of the user. The receiver may be configured to convert an audio electrical signal into a sound signal. The microphone may be configured to convert a sound signal into an electrical signal. The antenna module may be configured to transmit and receive electromagnetic waves. The light sensor module may be configured to sense ambient brightness and a proximity distance of an object. The light sensor module may be a three-in-one module of an infrared emitter, a proximity sensor, and an ambient light sensor. The light sensor may be configured to detect the intensity of the ambient light.

In some embodiments, the electronic assembly 14 may include camera module 141. As shown in FIGS. 3-5, when the slider 12 is in the first position, the camera module 141 may be received in the receiving groove 118. As shown in FIG. 3 and FIG. 4, when the slider 12 is in the second position, the camera module 141 may be exposed out of the receiving groove 118.

As shown in FIGS. 3-5 together, the slider 12 may further include a front surface 123 and a rear surface 124 opposite to each other. The front surface 123 may be connected between the pair of side surfaces 121 and connected to the top surface 122. The rear surface 124 may be connected between the pair of side surfaces 121 and connected to the top surface 122. At least one transmission portion 125 may be arranged on the slider 12. The transmission portion 125 may be arranged on at least one of the side surface 121, the top surface 122, the front surface 123, or the rear surface 124. The transmission portion 125 arranged on the side surface 121 or the top surface 122 may be always exposed outside and will not be blocked by the middle frame 11. In this way, when the slider 12 extends out or retracts back, the electronic assembly 14 corresponding to the transmission portion 125 arranged on the side surface 121 or the top surface 122 may always be able to be interacted with the user. The transmission portion 125 on the front surface 123 or the rear surface 124 may be exposed out when the slider 12 extends out, such that the electronic assembly 14 corresponding to the transmission portion 125 on the front surface 123 or the rear surface 124 may be interacted with the user. However, when the slider 12 retracts back into the middle frame 11, the transmission portion 125 on the front surface 123 or the rear surface 124 may be blocked by the middle frame 11, such that the electronic assembly 14 corresponding to the transmission portion 125 on the front surface 123 or the rear surface 124 will not be interacted with the user. The configuration of the transmission portion 125 may match with a type of a signal that is transmitted in the transmission portion 125. For example, when the transmission signal is an optical signal, the transmission portion 125 may be a through-hole or made of transparent material.

The middle frame 11 may include a rim 1101, and a front housing 1102 and a rear housing 1103 which are disposed on two opposite sides of the rim 1101. The rim 1101 in this embodiment may include the left end face 111a, the right end face 111b, the top end face 112, and the bottom end face 113. The rear end face 119 may be formed on the rear housing 1103, and the display screen 15 may be connected to the front housing 1102.

The front housing 1102, a top end of the rim 1101, and the rear housing 1103 collectively enclose the receiving groove 118. The top end of the rim 1101 may be recessed relative to a top end of the front housing 1102 and a top end of the rear housing 1103. In other words, a length of the rim 1101 in the length direction Y is less than a length of the front housing 1102 and a length of the rear housing 1103 in the length direction Y. The front surface 123 of the slider 12 may face towards the front housing 1102, and the rear surface 124 of the slider 12 may face towards the rear housing 1103. When the slider 12 is received in the receiving groove 118, the front housing 1102, the slider 12 and the rear housing 1103 form a sandwich-like structure, such that when the mobile terminal 1 is falling down or crashed by an external force, the front housing 1102 and the rear housing 1103 may provide a protection to the slider 12 located between the front housing and the rear housing, thereby preventing a damage to the slider 12 and the electronic assembly 14 received in the slider 12.

The mobile terminal 1 may further include a drive mechanism (not shown in the drawings) and a guide mechanism (not shown in the drawings). The drive mechanism and the guide mechanism may be located in the middle frame 11.

The drive mechanism may be connected to (including electrically connection and signal connection) a main board. The drive mechanism may be configured to drive the slider 12 to carry the electronic assembly 14 to move relative to the middle frame 11. The guide mechanism may be disposed between the slider 12 and the middle frame 11. The guide mechanism may be configured to provide a limitation to the slider 12, such that the slider 12 may move in the direction guided by the guide mechanism. In other words, the slider 12 may be slidable in the receiving groove 118 relative to the middle frame 11 via the drive mechanism. The guide mechanism may be disposed between the slider 12 and the middle frame 11, such that the slider 12 may extend out of or retract into the receiving groove 118 in the direction guided by the guide mechanism when driven by the drive mechanism. In some embodiments, the guide mechanism may guide the slider 12 to move in the length direction Y of the mobile terminal 1. One or more devices or modules may be arranged in the width direction X of the mobile terminal 1, such that the one or more devices or module may extend out of or retract into the receiving groove 118 at the same time or near time.

The mobile terminal 1 may also include a display screen 15. The display screen 15 may be mounted on the front housing 1102. The display screen 15 may be a touch display screen to achieve the display function and the touch function. The display screen 15 may include a glass cover and a display module fixed to the glass cover. The display module may be an organic light emitting diode display module or a liquid crystal display module. In some embodiments, the front end face 110 may be completely or partially formed by a display area of the display screen 15. In other embodiments, the mobile terminal 1 may be a tablet, and the like.

It can be understood that, the display screen 15 of the mobile terminal 1 may be implemented as an LCD (Liquid Crystal Display) screen configured to display information. The LCD screen may be implemented as a TFT (Thin Film Transistor) screen, an IPS (In-Plane Switching) screen, or an SLCD (Splice Liquid Crystal Display) screen. The display screen 15 may also be implemented as an OLED (Organic Light-Emitting Diode) screen configured to display information. The OLED screen may be implemented as an AMOLED (Active Matrix Organic Light Emitting Diode) screen, a Super AMOLED (Super Active Matrix Organic Light Emitting Diode) screen, or a Super AMOLED Plus (Super Active Matrix Organic Light Emitting Diode Plus) screen. These will not be described in details here.

In the present disclosure, the electronic assembly 14 is disposed in the slider 12, and the slider 12 is slidable in the receiving groove 118 relative to the middle frame 11. In this way, when it is necessary to use the electronic assembly 14, the electronic assembly 14 may slide out of the middle frame 11, such that the electronic assembly 14 may be unfolded relative to the display screen 15. In this way, the limitation to the screen ratio of the display screen 15 of the mobile terminal 1 due to the use of the electronic assembly 14 may be avoided, and thus the screen ratio of the mobile terminal 1 may be increased.

The mobile terminal 1 may include a rear cover 16 fixed to the middle frame 11. The rear cover 16 may be mounted on the rear housing 1103. The rear cover 16 may be a metal cover or a glass cover.

The rear cover 16 may have a top edge 161 that faces towards the top end face 112. The top edge 161 may include an intermediate portion 1611 and two edge portions 1612 connected to two opposite ends of the intermediate portion 1611. The intermediate portion 1611 may be recessed toward the middle of the rear cover 16 relative to the two edge portions 1612. At this time, the top edge 161 may define a window 1163 communicating with the receiving groove 118.

In some embodiments, since the rear cover 16 defines the window 1163, when the slider 12 extends out of the receiving groove 118 to a short distance, at least one transmission portion 125 located on the rear surface 124 of the slider 12 may be exposed from the window 1163. In this way, the device or module corresponding to the at least one transmission portion 125 may be interacted with the user; for example, the camera module may be used to perform shooting. Therefore, the window 1163 may be arranged in such a way that, the slider 12 slides a short distance when the slider 12 extends out, such that a reaction speed of some devices or modules may be increased, and an energy consumption of the mobile terminal 1 may be reduced.

In this case, the rear cover 16 may also have a side edge 164 and a transitional curved edge 165 connected between the side edge 164 and the top edge 161. The transitional curved edge 165 may be in shape of an arc. The side edge 164 may be disposed facing towards the side end face 111 of the middle frame 11. As shown in FIG. 5, a shape of the top end of the rear housing 1103 may match with a shape of the top edge 161 of the rear cover 16, and also match with a shape of the transitional curved edge 165.

As shown in FIG. 3, the middle frame 11 of the mobile terminal 1 may include the rim 1101. The rim 1101 may be made of metal material or a non-metal material. For example, the rim 1101 may be made of aluminum alloy, magnesium alloy, or stainless steel. In some embodiments, the rim 1101 may also be made of plastic, ceramic, glass, and the like. When the rim 1101 is made of metal, the rim 1101 may define a partition groove, and the partition groove may be filled with insulating materials to form an insulating portion (also called as "partition strip"). The partition strip may be configured to connect the rim 1101 separated by the partition groove, and all separated portions of the housing may be insulated from each other by the partition strip. The partition groove may include a first partition groove and a second partition groove. The first partition groove may be defined near the top of the rim 1101, and the second partition groove may be defined near the bottom of the rim 1101. A distance from the first partition groove to the slider 12 may less than a distance from the second partition groove to the slider 12. The partition strip may include a first partition strip and a second partition strip. The first partition strip may be filled in the first partition groove, such that an antenna signal of the mobile terminal 1 may be exited from the first partition groove, thereby reducing a shielding effect generated by the rim 1101 to the antenna signal. The second partition strip may be filled in the second partition groove, such that the antenna signal of the mobile terminal 1 may be exited from the second partition groove, thereby reducing a shielding effect generated by the housing to the antenna signal.

More specifically, the rim 1101 may include one or more insulating portions 1104 (partition strip) and one or more conductive portions 1105 (other portions of the rim 1101) that are separated from each other by one or more insulating portions 1104. Each of the one or more conductive portions 1105 may be made of electrically conductive material such as a metal. Two adjacent conductive portions 1105 separated from each other by the insulating portion 1104 may be insulated from each other. For example, as shown in FIG. 3, the rim 1101 may include four insulating portions 1104 and three conductive portions 1105. The three conductive portions 1105 may be separated from each other by the insulating portions 1104.

In some embodiments, the conductive portion 1105 may be used as a radiator of a part of the antenna module of the mobile terminal 1. In some other embodiments, the radiator may be fixed at an inner side of the rim 1101. The radiator may be disposed corresponding to the insulating portions 1104, and the insulating portions 1104 may act as a clearance region of the antenna radiation. In the present disclosure, the insulating effect provided by the insulating portion 1104 and between the two adjacent conductive portions 1105 which are separated from each other by the insulating portion 1104 may affect the signal transmission/reception quality of the antenna module in the mobile terminal 1.

As shown in FIG. 3, the insulating portion 1104 of the rim 1101 may include a top insulator 1106 near the top end face 112 of the middle frame 11 and a bottom insulator 1107 near the bottom end face 113 of the middle frame 11. The top insulator 1106 may be located at the top end of the rim 1101 that is near the receiving groove 118. The mobile terminal 1 may include a top antenna module located inside the slider 12 and a bottom antenna module located inside the middle frame 11 and near the top end face 112. The top antenna module may be disposed corresponding to the top insulator 1106. Signals transmitted and received by the top antenna module may be transmitted through the top insulator 1106. The bottom antenna module may be disposed corresponding to the bottom insulator 1107. Signals transmitted and received by the bottom antenna module may be transmitted through the bottom insulator 1107.

Figure 6:
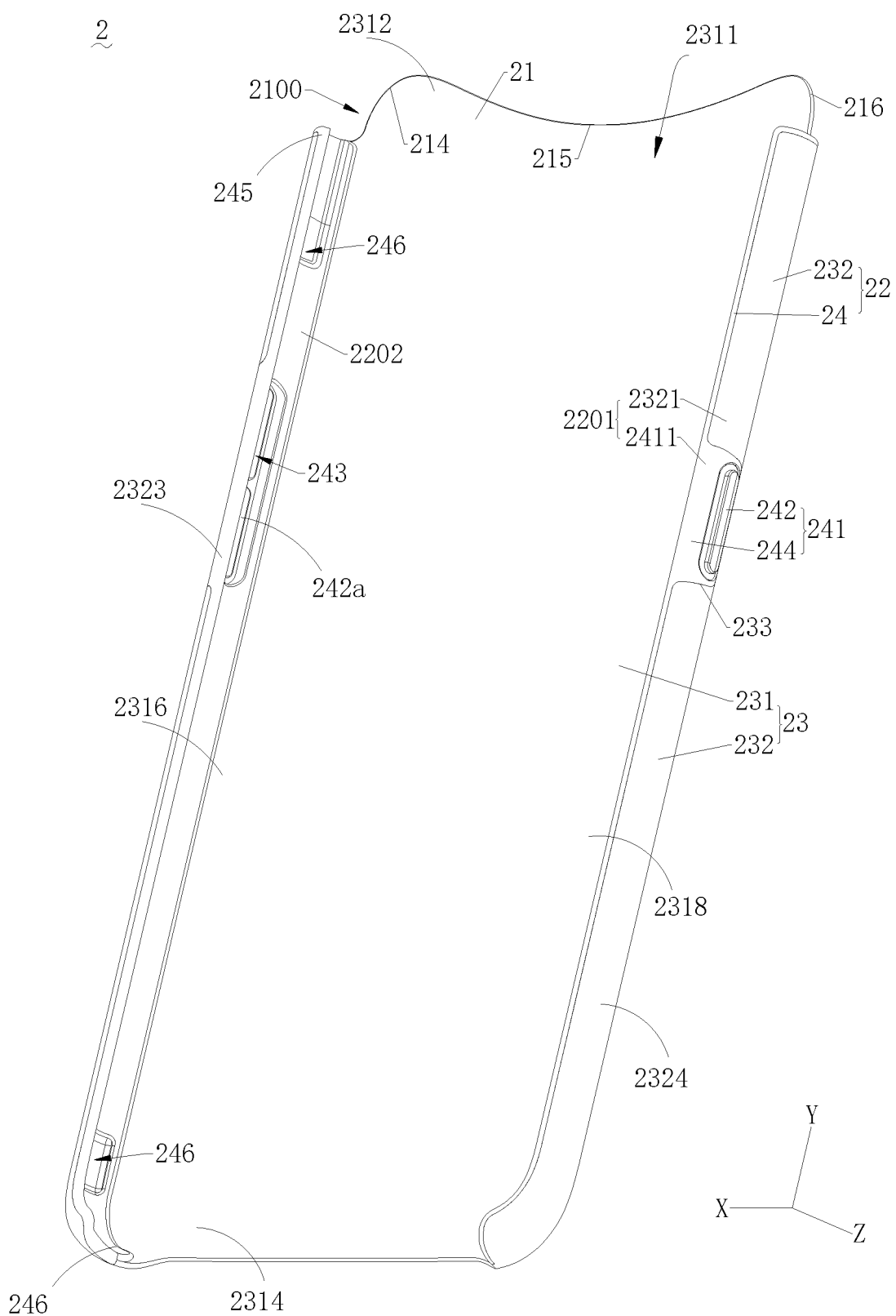
FIG. 6 is a schematic structural view of the protective case for the mobile terminal shown in FIG. 2, but viewed from another angle.
Figure 7:
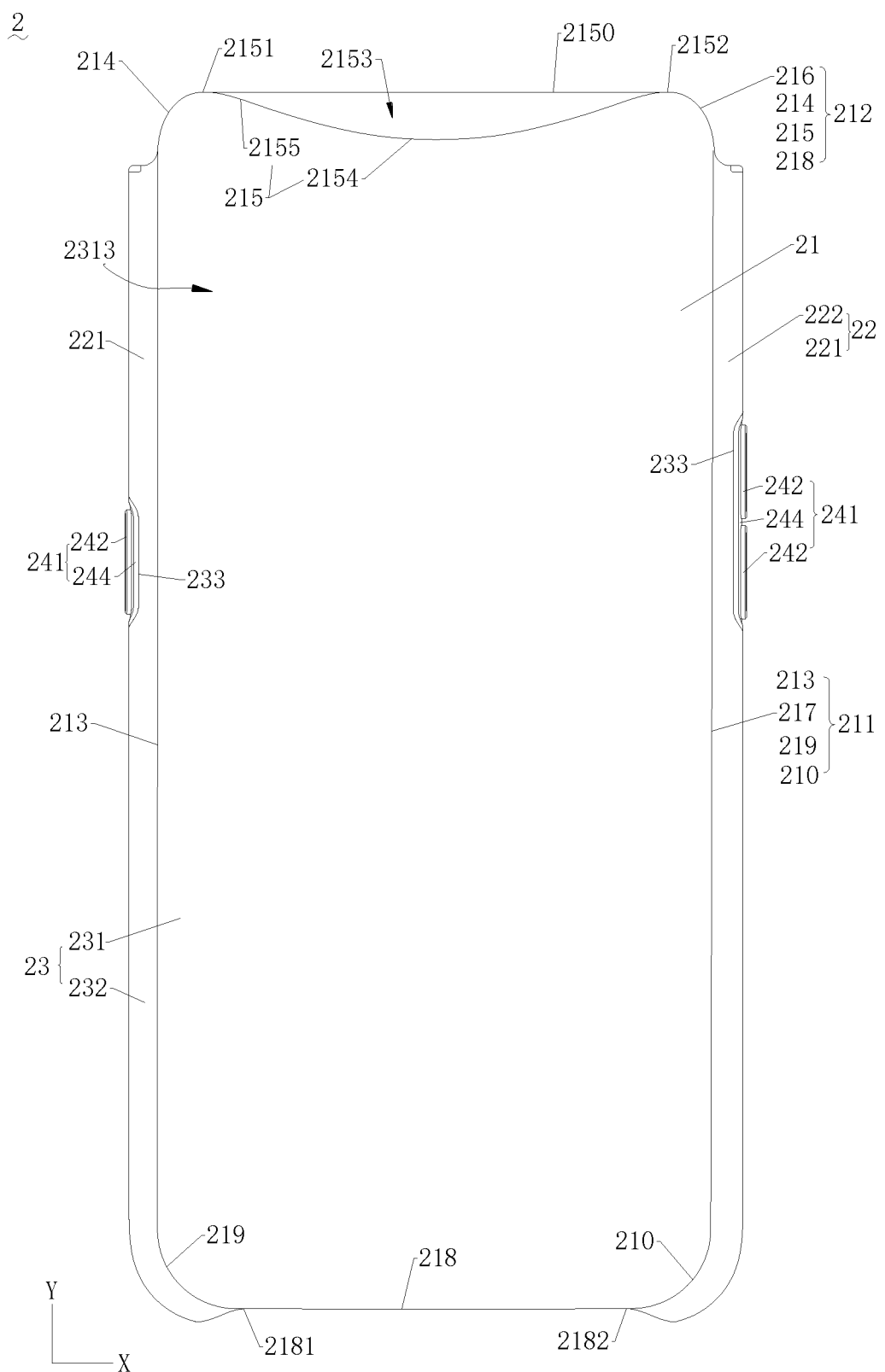
FIG. 7 is a schematic structural view of the protective case for the mobile terminal shown in FIG. 2, but viewed from yet another angle.
Figure 8:
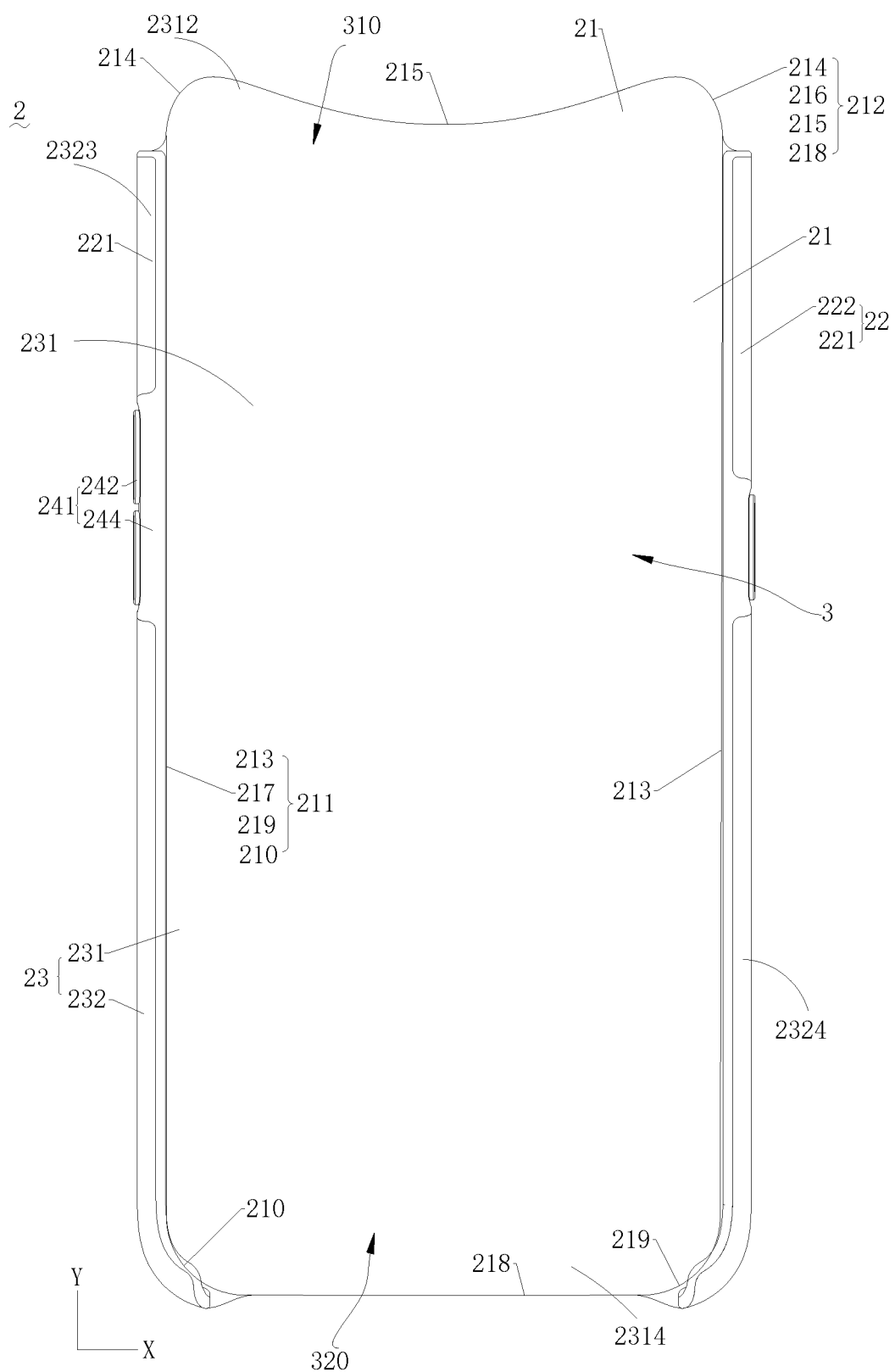
FIG. 8 is a schematic structural view of the protective case for the mobile terminal shown in FIG. 2, but viewed from still another angle.

As shown in FIGS. 6-8, FIG. 6 is a schematic structural view of the protective case 2 for the mobile terminal shown in FIG. 2, but viewed from another angle; FIG. 7 is a schematic structural view of the protective case 2 for the mobile terminal shown in FIG. 2, but viewed from yet another angle; FIG. 8 is a schematic structural view of the protective case 2 for the mobile terminal shown in FIG. 2, but viewed from still another angle.

The protective case 2 may include a bottom plate 21 and a side plate 22. The side plate 22 may be fixed to a periphery (211, 212) of the bottom plate 21. The periphery (211, 212) of the bottom plate 21 may include a connecting portion 211 connected to the side plate 22 and a non-connecting portion 212 disconnected to the side plate 22. In other words, the side plate 22 is connected to the connecting portion 211 of the periphery (211, 212) of the bottom plate 21. The side plate 22 is not connected to the non-connecting portions 212 of the periphery (211, 212) of the bottom plate 21.

The periphery (211, 212) of the bottom plate 21 may further include a first straight edge 213, a first transitional curved edge 214, a first side 215, a second transitional curved edge 216, and a second straight edge 217 which are connected one after another.

The second straight edge 217 may be deposited opposite to the first straight edge 213, and both second straight edge 217 and the first straight edge 213 belong to the connecting portion 211. The first straight edge 213 may be substantially rectilinear, or may be slightly inclined or bent. The second straight edge 217 may be substantially rectilinear, or may be slightly inclined or bent. The first straight edge 213 may be substantially parallel to the second straight edge 217, or the first straight line 213 may be slightly inclined at an angle to the second straight line 217. The side plate 22 may be connected to the first straight edge 213 and the second straight edge 217.

The first transitional curved edge 214 may be smoothly connected to the first straight edge 213 and the first edge 215. The second transitional curved edge 216 may be smoothly connected to the first side 215 and the second straight edge 217. An extending direction of the first edge 215 may be substantially coincident with the direction directed from the first straight edge 213 to the second straight edge 217. In other words, a line 2150 connecting two end points (2151, 2152) of the first edge 215 may be substantially perpendicular to the first straight edge 213 or the second straight edge 217. The first edge 215 may be substantially a rectilinear edge or an edge substantially in shape of an arc. The present disclosure may be described using the first side 215 substantially in shape of an arc as an example. In the length direction Y of the mobile terminal 1, an intersection of the first transitional curved edge 214 and the first edge 215 (that is, one end point 2151 of the first edge 215) may protrude relative to the first transitional curved edge 214 and the first edge 215. An intersection of the second transitional curved edge 216 and the first edge 215 (that is, the other end point 2152 of the first edge 215) may also protrude relative to the second transitional curved edge 216 and the first edge 215. The first transitional curved edge 214 and the second transitional curved edge 216 may be arranged in such a way that corners of the protective case 2 are rounded, thereby avoiding hurting hands of the user.

The non-connected portion 212 may include the first transitional curved edge 214, the first edge 215, and the second transitional curved edge 216. The side plate 22 may be not connected to the first transitional curved edge 214, the first edge 215, and the second transitional curved edge 216.

When the protective case 2 is sleeved on the outer side of the mobile terminal 1 (as shown in FIGS. 3-5), the portions of the side plate 22 respectively connected to the first straight edge 213 and the second straight edge 217 may be attached to the pair of side end faces 111. In the present disclosure, A being attached to B means that A is in contact with B. For example, the side plate 22 may be attached to the side surfaces of the rim 1101, the front housing 1102, and the rear housing 1103 of the mobile terminal 1 that form the side end face 111, respectively. The side plate 22 may be attached to the mobile terminal 1, such that the side plate 22 may provide a limitation to the mobile terminal 1, thereby preventing the mobile terminal 1 from being accidentally detached from the protective case 2. The rear cover 16 of the mobile terminal 1 may face towards the bottom plate 21 of the protective case 2. The slider 12 of the mobile terminal 1 may be disposed at the same side as the first edge 215 of the bottom plate 21. The slider 12 may extend out or retract into the protective case relative to the first edge 215, the first transitional curved edge 214, and the second transitional curved edge 216.

In the present disclosure, since the non-connecting portion 212 includes the first transitional curved edge 214, the first edge 215, and the second transitional curved edge 216, no side plate 22 may be disposed on the first transitional curved edge 214, the first edge 215, and the second transitional curved edge 216. In this way, the side plate 22 will not block the regions near the first transitional curved edge 214, the first edge 215, and the second transitional curved edge 216. Thus, a notch 2100 may be defined in the protective case 2 at the first transitional curved edge 214, the first edge 215, and the second transitional curved edge 216. Therefore, the sliding structure (such as the slider 12) of the mobile terminal 1 mounted at the inner side of the protective case 2 may extend out or retract back into the protective case through the notch 2100. Therefore, the sliding requirement of the sliding structure of the mobile terminal 1 mounted in the protective case 2 can be met without needing to frequently remove the protective case 2. The protective case 2 of the present disclosure may be convenient to use.

As shown in FIGS. 6-8 together, the periphery (211, 212) of the bottom plate 21 may further include a second edge 218, a third transitional curved edge 219 and a fourth transitional curved edge 210. The second edge 218 may be disposed opposite to the first edge 215. An extending direction of the second edge 218 may be substantially coincident with the direction directed from the first straight edge 213 towards the second straight edge 217. In other words, a line connecting two end points (2181, 2182) of the second edge 218 may be substantially perpendicular to the first straight edge 213 or the second straight edge 217. The second edge 218 may be substantially a rectilinear edge or an edge substantially in shape of an arc. The third transitional curved edge 219 may be connected between the first straight edge 213 and the second edge 218. The fourth transitional curved edge 210 may be connected between the second straight edge 217 and the second edge 218. The first straight edge 213, the first transitional curved edge side 214, the first edge 215, the second transitional curved edge side 216, the second straight edge 217, the fourth transitional curved edge side 210, the second edge 218, and the third transitional curved edge 219 of the periphery (211, 212) of the bottom plate 21 may be connected one after another. In the length direction Y of the mobile terminal 1, an intersection of the third transitional curved edge 219 and the second edge 218 (that is, one end point 2181 of the second edge 218) may protrude relative to the third transitional curved edge 219. An intersection of the fourth transitional curved edge 210 and the second edge 218 (that is, the other end point 2182 of the second edge 218) may also protrude relative to the fourth transitional curved edge 210.

The connection portion 211 may include the third transitional curved edge 219 and the fourth transitional curved edge 210. When the protective case 2 is sleeved at the outer side of the mobile terminal 1, a portion of the side plate 22 that is connected to the third transitional curved edge 219 and a portion of the side plate 22 that is connected to the fourth transitional curved edge 210 may be attached to the mobile terminal 1. More specifically, the portion of the side plate 22 that is connected to the third transitional curved edge 219 may be attached to the fourth transitional curved surface 117 of the middle frame 11 of the mobile terminal 1, and the portion of the side plate 22 that is connected to the fourth transitional curved edge 210 may be attached to the third transitional curved surface 116 of the middle frame 11 of the mobile terminal 1 (as shown in FIG. 4). When the side plate 22 is attached to the third transitional curved surface 116 and the fourth transitional curved surface 117, the side plate 22 may provide a limitation to the mobile terminal 1, thereby preventing the mobile terminal 1 from being accidentally detached from the protective case 2.

The second edge 218 may belong to the connecting portion 211 or the non-connecting portion 212.

In some embodiments, as shown in FIGS. 6-8 together, the second edge 218 belongs to the non-connecting portion 212. The side plate 22 may include two portions (221, 222). A portion 221 may extend from the first straight edge 213 to the third transitional curved edge 219, and the other portion 222 may extend from the second straight edge 217 to the fourth transitional curved edge 210. The second edge 218 may not be connected to the side plate 22, and the space defined by the second edge 218 may allow the devices or modules inside the mobile terminal 1 to be interacted with the user.

Figure 9:
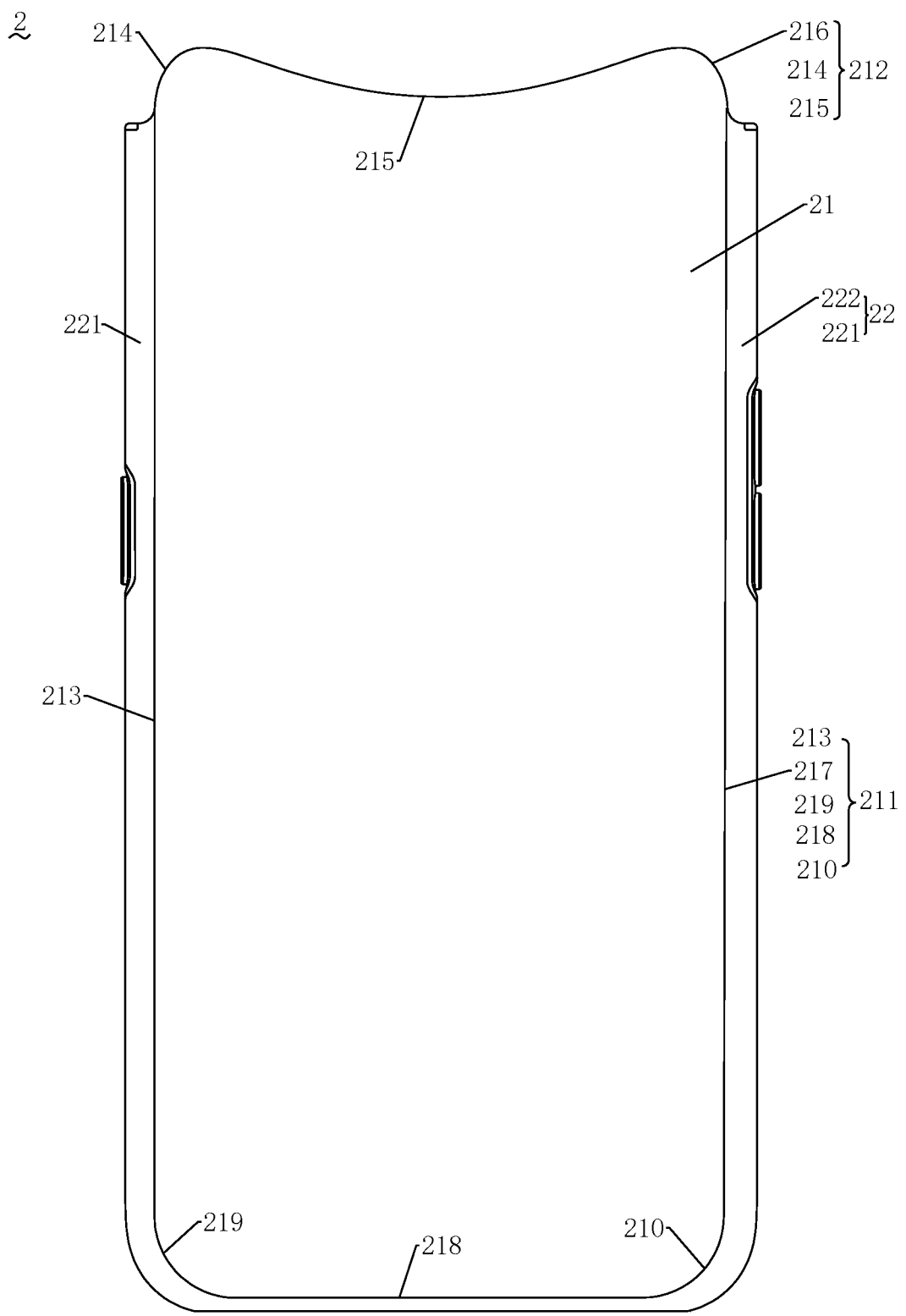
FIG. 9 is a schematic structural view of another protective case for a mobile terminal according to some embodiments of the present disclosure.

In some embodiments, as shown in FIG. 9, FIG. 9 is a schematic structural view of another protective case for a mobile terminal according to some embodiments of the present disclosure. The second edge 218 may belong to the connecting portion 211. The side plate 22 may include two portions (221, 222). A portion 221 may extend from the first straight edge 213, extend through the third transitional curved edge 219, and further extend to the second edge 218. The other portion 222 may extend from the second straight edge 217, extend through the fourth transitional curved edge 210, and further extend to the second edge 218. When the protective case 2 is sleeved at the outer side of the mobile terminal 1, the portion of the side plate 22 that is connected to the second edge 218 may also be attached to the mobile terminal 1, for example, attached to the bottom end face 113 of the mobile terminal 1. Thus, the side plate 22 may provide a limitation to the mobile terminal 1, and the connection between the protective case of the mobile terminal 1 and the mobile terminal 1 may be stronger, thereby preventing the mobile terminal 1 from being accidentally detached from the protective case 2.

As shown in FIG. 9, the two portions (221, 222) may be connected to each other on the second edge 218. In other embodiments, a gap may also be defined on the second edge 218 and between the two portions (221, 222). At this time, a portion of the second edge 218 belongs to the connecting portion 211, and the other portion of the second edge 218 belongs to the non-connecting portion 212. When the two portions (221, 222) of the side plate 22 defines the gap on the second edge 218, a transmission portion (for example, the transmission portion may be one or more of the sound-output hole, the sound-input hole, and the connecting through-hole) provided on the bottom end face 113 of the mobile terminal 1 may be exposed out of the protective case 2 via the gap. In this way, the device or module corresponding to the portion of the transmission portion 125 may be convenient to be interacted with the user.

As shown in FIGS. 6 to 8, the first edge 215 of the bottom plate 21 of the protective case 2 may have a same shape as the top edge 161 of the rear cover 16 (as shown in FIGS. 4 and 5). At this time, the shape of the first edge 215 of the bottom plate 21 may match with the shape of the top edge 161 of the rear cover 16, such that the bottom plate 21 may better protect the rear cover 16.

For example, the first edge 215 may include a central region 2154 and two edge regions 2155 connected to two opposite ends of the central region 2154. The central portion 2154 may be recessed from the two edge regions 2155 towards the middle of the bottom plate 21. The first edge 215 may be recessed to form a transmission area 2153 (also called as a clearance portion which may have a recess configuration in some embodiments) that communicates with the window 1163 of the rear cover 16 of the mobile terminal 1. In some embodiments, as further shown in FIGS. 3 and 4, the camera module 141 may include a front camera 1411 and a rear camera 1413. When the camera module 141 is in the second position, the front camera 1411 may be exposed out from one side of the mobile terminal at which the display screen 15 is disposed, and the rear camera 1413 may be exposed out from one side of the mobile terminal that faces away from the display screen 15. With the above structure of the protective case 2, it may be possible to shorten the moving distance of the camera module 141 between the first position and the second position, such that the rear camera 1413 may be exposed from the transmission area 2153 after moving a short distance, and thus the time during which the camera module 141 moves from the first position to the second position may be shortened.

As further shown in FIGS. 6-8, FIG. 10 is a schematic structural view of the protective case 2 for the mobile terminal shown in FIG. 2, but viewed from a further angle.

The protective case 2 may include a first shell 23 and a second shell 24, a receiving space 3 (as shown in FIG. 2) configured to receive the mobile terminal is defined by the first shell 23 and the second shell 24. The first shell 23 may be made of material having a strength greater than a strength of material of the second shell 24. For example, the first shell 23 may be made of Kevlar (the material is "polyparaphenylene terephthalamide", and also known as KEVLAR). The second shell 24 may be made of polyurethane (Thermoplastic Urethane, TPU) material. In other embodiments, the material of the first shell 23 and the material of the second shell 24 may also be other materials.

The first shell 23 may include a body portion 231 and a rim portion 232. The rim portion 232 may be fixed to the periphery (211, 212) of the body portion 231. The body portion 231 may form the bottom plate 21. That is to say, the body portion 231 is the bottom plate 21 of protective case 2 in some embodiments of the present disclosure.

More specifically, in some embodiments, the body portion 231 may include a front end surface 2311 and a rear end surface 2313 disposed opposite to the front end surface 2311. When the protective case 2 is sleeved on the mobile terminal 1, the front end surface 2311 may be attached to the mobile terminal 1 and the rear end surface 2313 may be exposed outside. When the user holds the protective case 2, the rear end surface 2313 of the body portion 231 may be directly contacted with the user.

In some embodiments, the body portion 231 may include a top end portion 2312. The top end portion 2312 may include the first edge 215, the first transitional curved edge 214, and the second transitional curved edge 216.

The transmission area 2153 (also called as clearance portion) may extend through the front end surface 2311 and the rear end surface 2313. Besides, the transmission area 2153 may extend through the edge of the top end portion 2312. In the embodiment shown in FIG. 10, after the mobile terminal 1 is disposed in the protective case 2, in the width direction of the mobile terminal 1, the top end portion 2312 of the protective case 2 may have a middle portion lower than two ends of the first edge 215 of the top end portion 2312.

In some embodiments, the body portion 231 may further include a bottom end portion 2314 disposed opposite to the top end portion 2312, a left end portion 2316, and a right end portion 2318 disposed opposite to the left end portion 2316. The left end portion 2316 may be connected between the top end portion 2312 and the bottom end portion 2314, and the right end portion 2318 may be connected between the top end portion 2312 and the bottom end portion 2314. Herein, the bottom end portion 2314 may include the second edge 218, the third transitional curved edge 219, and the fourth transitional curved edge 210. The left end portion 2316 may include the second straight edge 217, and the right end portion 2318 may include the first straight edge 213.

The second shell 24 may be fixed to an inner side of the rim portion 232 that faces towards the body portion 231. In other words, the first shell 23 may be located at an outer side of the protective case 2 relative to the second shell 24, and the second shell 24 may be located at an inner side of the protective case 2 relative to the first shell 23. The term "inner side" used here means the side of the protective case 2 that is close to the mobile terminal when the mobile terminal is disposed or received in the protective case 2. The second shell 24 and the rim portion 232 together form the side plate 22. Thus, the receiving space 3 is defined by the body portion 231 of the first shell 23 and the second shell 24. When the protective case 2 is sleeved at the outer side of the mobile terminal 1 (as shown in FIGS. 3-5), the second shell 24 may be located between the rim portion 232 and the mobile terminal 1.

In some embodiments, two rim portions 232 may be provided. The rim portions 232 may be disposed opposite to each other, and connected to the body portion 231. The body portion 231 may be located between the two rim portions 232. The body portion 231 and the rim portions 232 cooperatively define the receiving space 3 configured to receive the mobile terminal 1. The mobile terminal 1 may be disposed into the receiving space 3, and further taken out from the receiving space 3. The second shell 24 may be disposed at one side of each of the rim portions 232 that faces towards the receiving space 3. After the mobile terminal 1 is disposed in the receiving space 3, one of the two rim portions 232 may be attached to the left end face 111a, the other of the two rim portions 232 may be attached to the right end face 111b of the mobile terminal 1, and the body portion 231 may be attached to the rear end face 1103. In some embodiments, when the protective case 2 is sleeved on the mobile terminal 1, the two rim portions 232 may be located at two opposite sides in the width direction of the mobile terminal 1, and the two rim portions 232 may clamp the mobile terminal 1.

The two rim portions 232 may be called as a first rim portion 2323 and a second rim portion 2324. The first rim portion 2323 may be connected to the left end portion 2316, and extend along an extending direction of the left end portion 2316. The second rim portion 2324 may be connected to the right end portion 2318, and extend along an extending direction of the right end portion 2318.

Figure 14:
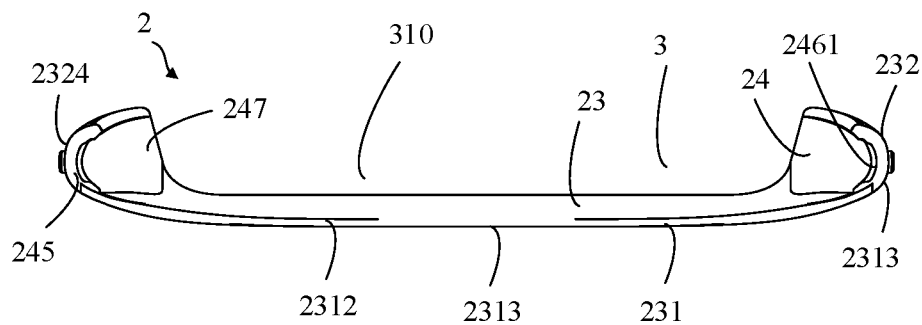
FIG. 14 is a top view of the protective case for the mobile terminal shown in FIG. 6.
Figure 15:
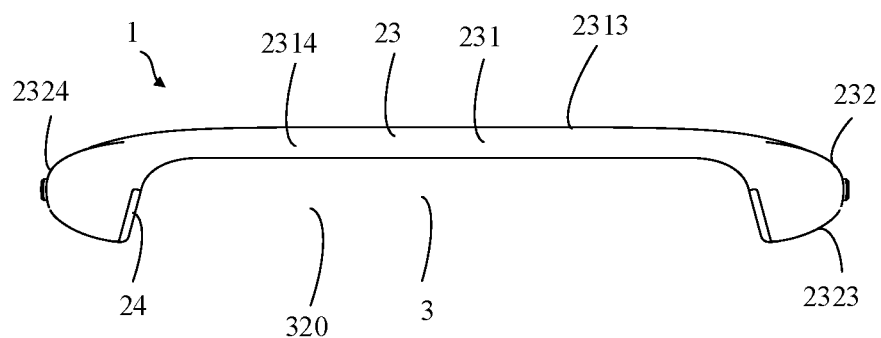
FIG. 15 is a bottom view of the protective case for the mobile terminal shown in FIG. 6.

As shown in FIG. 8, in some embodiments, the top end portion 2312 of the body portion 231 may protrude outwardly from one ends of the first rim portion 2323 and the second rim portion 2324, such that a first opening 310 may be defined in the top end portion 2312. The other end of the first rim portion 2323 and the other end of the second rim portion 2324 may extend towards to each other along the bottom end portion 2314, such that a second opening 320 may be defined in the bottom end portion 2314. As shown in FIGS. 14 and 15, a maximum width of the first opening 310 may be greater than a maximum width of the second opening 320 in the width direction X. In some embodiments, the mobile terminal 1 may be mounted into the receiving space 3 of the protective case 2 from the first opening 310. When the mobile terminal 1 is disposed in the receiving space 3, one end of the body portion 231 that is away from the slider 12 may abut against one end of the second shell 24 at which the second opening 320 is defined. The slider 12 may protrude out of the other end of the second shell 24, and further exposed from the receiving space 3. That is, the slider 12 may protrude out of the first opening 310. The above structure may facilitate the movement of the slider 12, thereby reducing or preventing a resistance formed by the protective case and applied to the movement of the slider 12.

In some embodiments, when the mobile terminal 1 is received in the receiving space 3, in the thickness direction of the mobile terminal 1, that is, in the depth direction of the receiving space 3, an end of the first rim portion 2323 that is located at the second opening 320 may protrude out of the surface of the display screen 15, and the end of the second rim portion 2324 that is located at the second opening 320 may protrude out of the surface of the display screen 15. In the mobile terminal assembly of the above structure, when the side of the mobile terminal at which the display screen 15 is located is placed on a support such as a table, portions of the first rim portion 2323 and the second rim portion 2324 that protrude out of the surface of the display screen 15 may abut against a surface of the support. In this way, is it possible to prevent the display screen 15 from contacting with the surface of the support, thereby preventing a sharp portion of the surface of the support from scratching the surface of the display screen 15.

In some embodiments, since the first shell 23 is located at the outer side of the protective case 2 relative to the second shell 24, and the first shell 23 has a high strength, the risk that the protective case 2 is worn, scratched or torn may be reduced, and thus the service life of the protective case 2 may be extended. Since the second shell 24 is located at the inner side of the protective case 2 relative to the first shell 23, the second shell 24 may be located between the rim portion 232 and the mobile terminal 1. In this way, when the electronic device 100 is falling down or cracked, the second shell 24 may act as a buffer between the first shell 23 and the mobile terminal 1, and provide buffering to the mobile terminal 1. Thus, it is possible to prevent the mobile terminal 1 from being damaged due to an external force directly transmitted from the first shell 23 to the mobile terminal 1.

In some embodiments, Kevlar have a permanent heat-resistant flame retardancy, a permanent antistatic property, a permanent acid and alkali resistance, an organic solvent erosion resistance, a high strength, a high wear resistance, a high tear resistance, and the like. The first shell 23 may be a portion of the protective case 2 that is frequently contacted by the user. When the mobile terminal 1 is mounted in the receiving space 3, the first shell 23 made of the above material may clamp the mobile terminal 1, thereby preventing the mobile terminal 1 from being easily separated from the protective case 2. Besides, the service life of the protective case 2 may be extended, and the use experience may be improved.

The TPU may have the properties of an abrasion resistance, an oil resistance, a low temperature resistance, a tear resistance, a good elasticity, and the like. The second shell 24 made of TPU may have a low hardness. When the mobile terminal 1 is mounted in the receiving space 3, the second shell 24 made of TPU may abut against an outer surface of the mobile terminal 1, thereby preventing the first shell 23 from scratching surfaces of the mobile terminal 1, and providing better cushioning and damping effects. For example, when the protective case 2 is sleeved on the mobile terminal 1 and the mobile terminal 1 accidentally falls down, the second shell 24 may absorb the impact of the first shell 23, thereby preventing the mobile terminal 1 from being easily broken.

In some embodiments, the body portion 231 may be integrally formed with the rim portions 232. For example, the protective case 2 may be formed by the first shell 23 and the second shell 24 by means of two-shot injection molding. In this way, the connection between the first shell 23 and the second shell 24 is strong, and thus the first shell and the second shell are not easily peeled or torn from each other.

As shown in FIGS. 6-8 and 10 together, the rim portion 232 of the first shell 23 may define a notch 233 at a position corresponding to a button of the mobile terminal 1, and the hollow region 233 in some case may also be called as a notch. A portion of the second shell 24 may be embedded or filled in the notch 233, such that a button portion 241 may be formed. The button portion 241 may be provided with a cap 242. The button 13 may be arranged on the side end face 111 of the mobile terminal 1 (as shown in FIGS. 3-5). When the protective case 2 is sleeved at the outer side of the mobile terminal 1, the cap 242 may wrap the button 13.

In some embodiments, combining with FIG. 6, a recess 242a may be defined in the cap 242, and the recess 242a may have a configuration (including the size and the shape) matching with that of the button, such that a receiving region 243 may be defined at the inner side of the cap 242, and the button portion 241 may be partially or completely received in the receiving region 243. When the mobile terminal 1 is disposed in the protective case 2, the button 13 of the mobile terminal 1 may be pressed by pressing the cap 242.

More specifically, at the position of the second shell 24 that corresponds to the button of the mobile terminal 1, the second shell 24 may protrude from a side facing towards the receiving space 3 to a side facing away from the receiving space 3, such that the recess 242a configured to receive the button configured to receive the button may be defined. That is to say, the recess 242a is recessed from a side of the second shell 24 that faces towards the receiving space 3 to another side of the second shell 24 that faces away from the receiving space 3.

Figure 11:
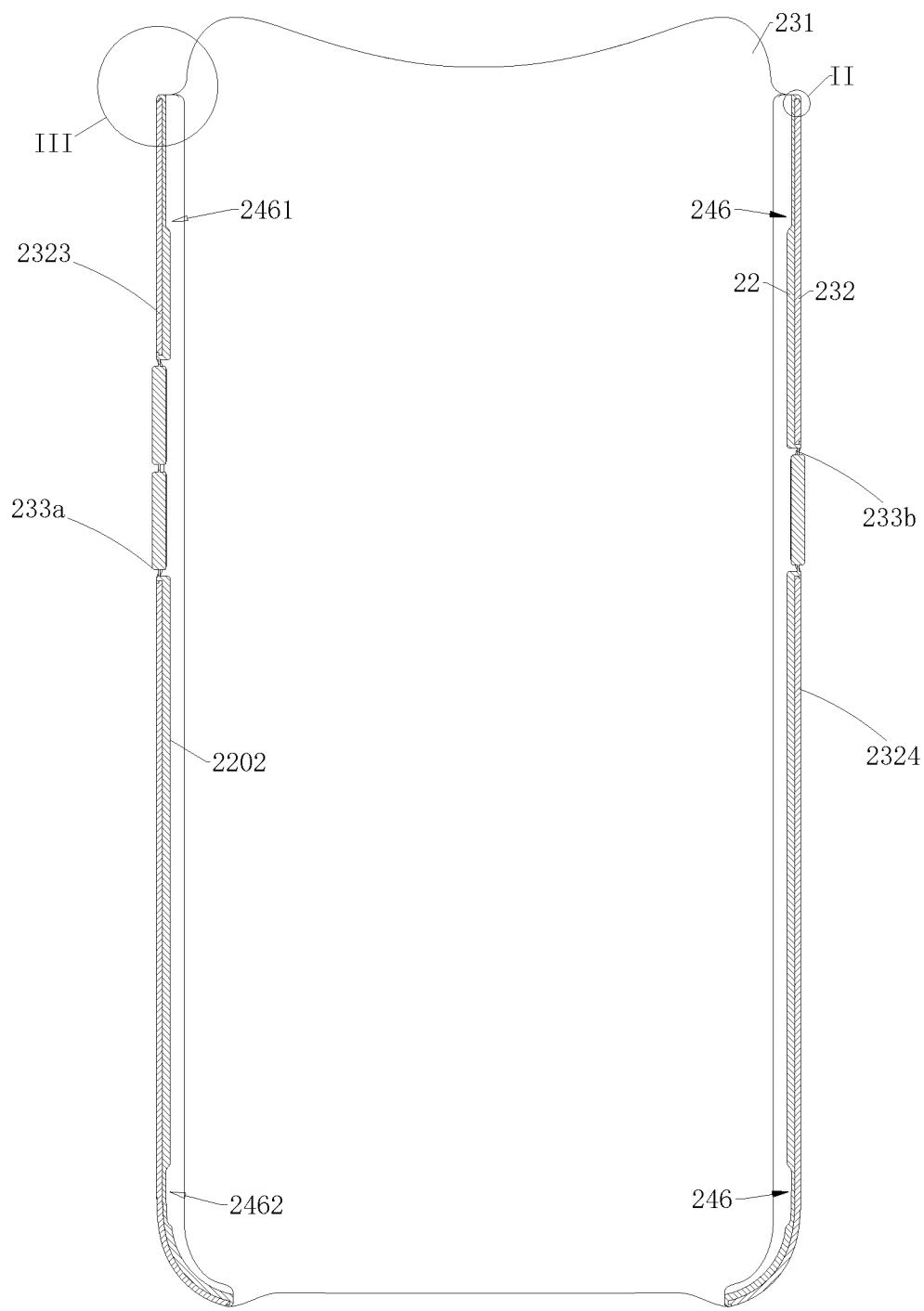
FIG. 11 is a cross-sectional view of the protective case for the mobile terminal shown in FIG. 10 taken along line I-I.

As shown in FIG. 11, in some embodiments, two notches or hollow regions may be provided. The two notches or hollow regions 233 may include a first notch 233a and a second notch 233b. The first notch 233a may be defined in the first rim portion 2323, and the second notch 233b may be defined in the second rim portion 2324.

In some embodiments, the first notch 233a may be defined in a position corresponding to a volume button of the mobile terminal 1, and the second shell 24 may be filled in the first notch 233a. At the position of the second shell 24 that corresponds to the volume button of the mobile terminal 1, the second shell 24 may protrude from a side facing towards the receiving space 3 to a side facing away from the receiving space 3, such that a first recess configured to receive the volume button may be defined. Since the second shell 24 has a lower material hardness, when the mobile terminal 1 is received in the receiving space 3, the second shell 24 corresponding to the first recess may be pressed, and easily deformed, such that the second shell 24 may abut against the volume button, and the volume button may be pressed. In this way, the user can adjust the volume of the mobile terminal 1.

The second notch 233b may be defined in a position corresponding to a power button of the mobile terminal 1, and the second shell 24 may be filled in the second notch 233b. At the position of the second shell 24 that corresponds to the power button of the mobile terminal 1, the second shell 24 may protrude from a side facing towards the receiving space 3 to a side facing away from the receiving space 3, such that a second recess configured to receive the power button may be defined. Since the second shell 24 has a lower material hardness, when the mobile terminal 1 is received in the receiving space 3, the second shell 24 corresponding to the second recess may be pressed, and easily deformed, such that the second shell 24 may abut against the power button, and the power button may be pressed. In this way, the user may turn on or off the mobile terminal, or lock or unlock the screen.

In this case, the second shell 24 may be made of a highly wear-resistant material such as polyurethane, such that the service life of the cap 242 may be extended. Meanwhile, when the second shell 24 is made of polyurethane, the cap may also have an outstanding impact resistance and damping performance, and may be resistant to oil, water, and mold.

The button portion 241 may further include a carrying portion 244. The cap 242 may be arranged on the carrying portion 244. The carrying portion 244 may be spliced with the rim portion 232 of the first shell 23.

Here, as shown in FIG. 6, the button portion 241 may include an outer surface 2411 facing away from the body portion 231 or the receiving space 3. The rim portion 232 may include an outer surface 2321 facing away from the body portion 231 or the receiving space 3. The outer surface 2411 of the button portion 241 may be spliced with the outer surface 2321 of the rim portion 232, and the outer surface 2411 and the outer surface 2321 may both form a part of an external surface 2201 of the side plate 22. In some embodiments, a portion of the external surface 2201 formed by the carrying portion 244 may be substantially flush with or at the same level with the outer surface 2321 of the rim portion 232, such that the gripping experience of the user may be improved. That is to say, a part of the carrying portion 244 forming the external surface 2201 may be substantially flush with or at the same level with the outer surface 2321 of the rim portion 232.

Figure 10:
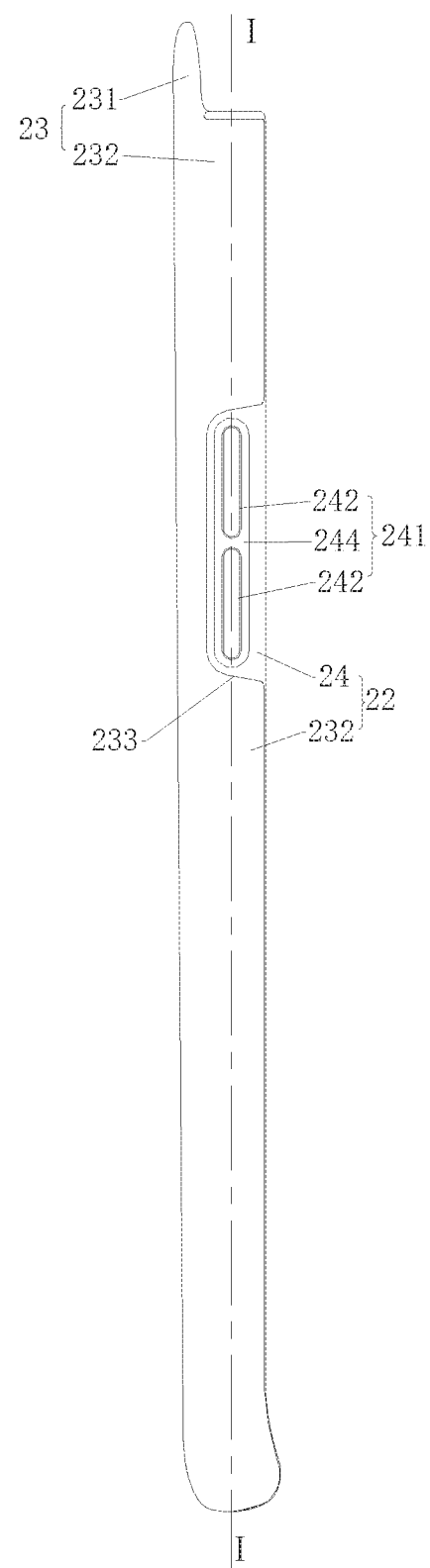
FIG. 10 is a schematic structural view of the protective case for the mobile terminal shown in FIG. 2, but viewed from still a further angle.

As shown in FIGS. 6, 8, and 11, FIG. 11 is a cross-sectional view of the protective case 2 for the mobile terminal shown in FIG. 10 taken along line I-I.

Each rim portion 232 may have an outer peripheral edge 2322 that is not connected to the body portion 231. In other words, the rim portion 232 may include a portion that is connected to the body portion and a portion that is not connected to the body portion. The portion that is not connected to the body portion is the outer peripheral edge 2322. The second shell 24 may wrap the outer peripheral edge 2322 of the rim portions 232 (including the first rim portion 2323 and the second rim portion 2324). Since the second shell 24 wraps the outer peripheral edge 2322, when the outer peripheral edge 2322 is crashed, the second shell 24 may serve as a buffer, and thus the risk of damaging the protective case 2 may be reduced. Further, when the second shell 24 wraps the outer peripheral edge 2322, the rim portion 232 of the first shell 23 may be better separated from the mobile terminal 1, and the second shell 24 can provide a better buffering. Further, when the user touches the protective case 2, the user may be not scratched by the outer peripheral edge 2322 of the rim portion 232 having a greater hardness.

Figure 12:
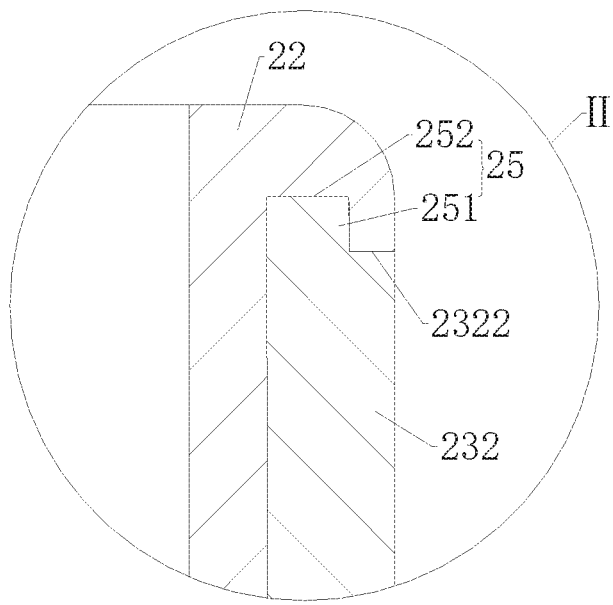
FIG. 12 is an enlarged view showing the structure of part II in the structure shown in FIG. 11.
Figure 13:
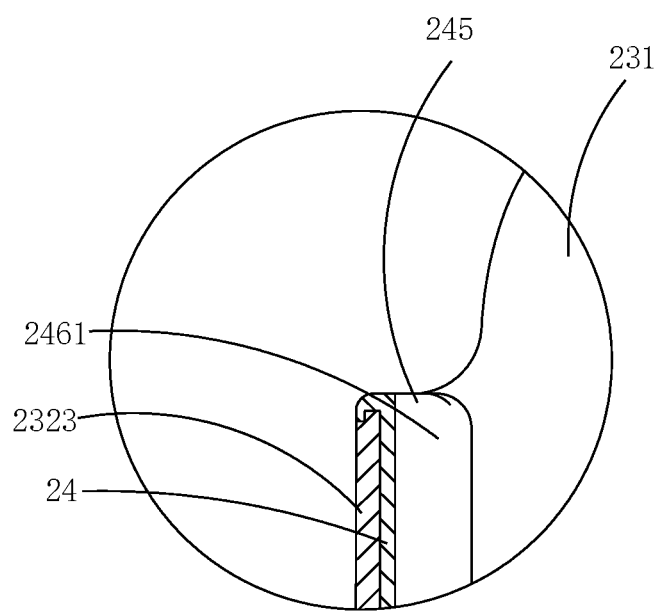
FIG. 13 is an enlarged view showing part III of the protective case for the mobile terminal shown in FIG. 11.

As shown in FIGS. 12-13 together, FIG. 12 is an enlarged view showing the structure of part II in the structure shown in FIG. 11. FIG. 13 is an enlarged view showing the structure of part III in the structure shown in FIG. 11. A mortise and tenon connection structure 25 may be provided between the outer peripheral edge 2322 and the second shell 24. That is, a protrusion 251 may be disposed on one of the outer peripheral edge 2322 and the second shell 24, and a groove 252 may be defined in the other of the outer peripheral edge 2322 and the second shell 24. The protrusion 251 may cooperate with the groove 252, such that the mortise and tenon connection structure 25 is formed, thereby improving the connection strength between the outer peripheral edge 2322 and the second shell 24. For example, the protrusion 251 may be disposed on the outer peripheral edge 2322, and the second shell 24 may define the groove 252. The protrusion 251 of the outer peripheral edge 2322 may be wrapped by the second shell 24 via the groove 252.

As shown in FIGS. 6 and 11 together, the second shell 24 may have an inner surface facing toward the body portion 231. The inner surface may form the internal surface 2202 of the side plate 22. One or more recessed clearance portions 246 may be defined in the inner surface of the second shell 24 (that is, the internal surface 2202). In some embodiments, the clearance portion may be a clearance groove or a clearance space or area.

More specifically, as shown in FIGS. 6-8 and combing with FIG. 2, in some embodiments, the clearance portions 246 may include at least one of a first clearance portion 2461, a second clearance portion 2462, and the transmission area 2153 (herein the transmission area 2153 is considered as a third clearance portion).

As further shown in FIGS. 6 and 14-15, in some embodiments, the second shell 24 may have a first end portion 245 and a second end portion 247. A distance from the first end portion 245 to the top end portion 2312 or the first edge 215 may be shorter than a distance from the second end portion 247 to the top end portion 2312 or the first edge 215. The first clearance portion 2461 may be arranged in the first end portion 245.

In some embodiments, the first clearance portion 2461 may be a clearance groove. The first clearance portion 2461 may extend through an edge of the first end portion 245. The first clearance portion 2461 may be configured to provide a clearance to the end of the slider 12 that is at the left end surface 211. When the slider 12 is switched between the first position and the second position, the first clearance portion 2461 may prevent the slider 12 from contacting with the protective case 2, such that it is possible to prevent frictional resistance from being generated by the protective case 2 due to the movement of the slider 12. Besides, the first clearance portion 2461 may also be configured to provide a clearance to the first partition strip and prevent the protective case 2 from contacting with the first partition strip, thereby reducing the adverse effect of the protective case 2 on the antenna signal of the mobile terminal 1.

It can be understood that, the first clearance portion 2461 may not extend through the first rim portion 2323. However, the first clearance portion 2461 may also extend through the first rim portion 2323, and thus the first clearance portion 2461 may have a U-shaped configuration. It may be understood that, the second rim portion 2324 may also define an element having a configuration similar to that of the first clearance portion 2461, and details will not be described herein.

As shown in FIG. 6, the second clearance portion 2462 may also be a clearance groove. More specifically, the second clearance portion 2462 may be disposed on a surface of the second end portion 247 that faces towards the receiving space 3. The second clearance portion 2462 may be configured to provide a clearance to the second partition strip of the mobile terminal 1. The second clearance portion 2462 is arranged in such a way that it is possible to prevent the protective case 2 from contacting with the first partition strip, thereby reducing the adverse effect of the protective case 2 on the antenna signal of the mobile terminal 1. It may be understood that, the second rim portion 2324 may also define an element having a configuration similar to that of the second clearance portion 2462, and details will not be described herein.

When the protective case 2 is sleeved at the outer side of the mobile terminal 1 (as shown in FIGS. 3-5), the clearance portion 246 may be disposed corresponding to the insulating portion 1104.

The number and the position of the clearance portions 246 may be set according to the number and the position of the insulating portions 1104, and the clearance portions 246 may match with the insulating portions 1104. For example, the number of the insulating portions 1104 may be four. The four insulating portions 1104 may be respectively located at two opposite sides of the rim 1101, and two insulating portions 1104 at the same side of the rim 1101 are spaced from each other in the length direction Y. Then, the number of the clearance portions 246 may also be four. The four clearance portions 246 may be respectively located at two opposite sides of the second shell 24, and the two clearance portions 246 at the same side of the second shell 24 are spaced from each other in the length direction Y. The four clearance portions 246 may be arranged corresponding to the positions of the four insulating portions 1104, such that when the protective case 2 is sleeved on the mobile terminal 1, the four insulating portions 1104 may be disposed in the four clearance portions 246 in one-to-one correspondence. In other embodiments, one clearance portion 246 may also be disposed corresponding to a plurality of insulating portions 1104.

In the present disclosure, the insulating effect provided by the insulating portion 1104 and between the two adjacent conductive portions 1105 which are separated from each other by the insulating portion 1104 may affect the signal transmission/reception quality of the antenna module in the mobile terminal 1. Since the insulating portion 1104 may provide a better insulating effect when the insulating portion 1104 is disposed corresponding to the clearance portion 246, the protective case 2 may have a less impact on the signal transmission/reception quality of the antenna module in the mobile terminal 1, such that the antenna transmission/reception performance of the electronic device 100 may be reliable.

In some embodiments, in the thickness direction Z of the electronic device 100, a width of the clearance portion 246 may be greater than the width of the rim 1101. In this way, it is possible to further reduce the impact of the second shell 24 on the transmission/reception quality of the antenna module of the mobile terminal 1.

In the protective case for a mobile terminal and the electronic device of the present disclosure, since the first transitional curved edge, the first edge and the second transitional curved edge belong to the non-connecting portion, no side plate is disposed on the first transitional curved edge, the first edge and the second transitional curved edge. In this way, the side plate will not block the regions near the first transitional curved edge, the first edge and the second transitional curved edge. Thus, a notch defined at the first transitional curved edge, the first edge and the second transitional curved edge, and a sliding structure (such as the slider) of the mobile terminal mounted at the inner side of the protective case is capable of extending out or retracting back into the protective case through the notch. Therefore, the sliding requirement of the sliding structure of the mobile terminal mounted in the protective case can be met without needing to frequently remove the protective case, and the protective case of the present disclosure is convenient to use.

Furthermore, it is to be understood that the use of the term "substantially" herein, unless otherwise defined with respect to a specific context, with respect to a numeric quantity or otherwise quantifiable relationship, e.g., perpendicularity or parallelism, is to be understood as indicating that quantity±10%. Thus, for example, lines that are substantially perpendicular to one another may be at angles between 81° and 99° to one another.

The embodiments of the present disclosure have been described in detail above, and the principles and implementations of the present disclosure are described in the specific examples. The description of the above embodiments is only configured to help with the understanding of the method of the present disclosure and its core ideas. Those skilled in the art may make modification in the specific embodiments and the scope of the present disclosure based on the idea of the present disclosure. In summary, the content of the present disclosure should not be construed as a limitation to the present disclosure.

What is claimed is:

1. A protective case for a mobile terminal, the mobile terminal comprising a middle frame, a slider slidable relative to the middle frame, and an electronic assembly disposed in the slider; the protective case comprising:
   a first shell, made of Kevlar and having a body portion and a rim portion, wherein the rim portion is fixed to a periphery of the body portion; and
   a second shell, made of polyurethane having a strength less than a strength of material of the first shell, wherein the second shell is fixed to an inner side of the rim portion that faces towards the body portion, such that a receiving space configured to receive the mobile terminal is defined by the first shell and the second shell;
   wherein the periphery of the body portion comprises:
      a first straight edge, connected to the rim portion;
      a second straight edge, disposed opposite to the first straight edge and connected to the rim portion; and
      a first edge, disposed between the first straight edge and the second straight edge and disconnected to the rim portion;
      wherein the first edge comprises a central region and two edge regions connected to two opposite ends of the central region; and the central region is recessed in a direction towards a middle of the body portion with respect to the two edge regions, such that a transmission area is formed by the central region and the edge regions; and
      when the slider retracts into the middle frame, the electronic assembly is hidden in the middle frame; when the slider extends out of the middle frame, the electronic assembly is exposed out of the protective case via the transmission area.

2. The protective case of claim 1, wherein the rim portion defines a notch; a part of the second shell is embedded in the notch to form a button portion, and a cap is arranged on the button portion and disposed corresponding to a button of the mobile terminal; and the cap protrudes out of the notch; and
   wherein a recess is defined in the cap and recessed from a side of the second shell that faces towards the receiving space to another side of the second shell that faces away from the receiving space; and the recess has a configuration matching with that of the button.

3. The protective case of claim 2, wherein the button portion has a first outer surface facing away from the receiving space, and the rim portion has a second outer surface facing away from the receiving space; and the first outer surface is spliced with the second outer surface.

4. The protective case of claim 3, wherein the button portion comprises a carrying portion, and the cap is arranged on the carrying portion; a part of the carrying portion forming the first outer surface is substantially flush with the second outer surface.

5. The protective case of claim 1, wherein the rim portion has an outer peripheral edge that is disconnected to the body portion, and the second shell wraps the outer peripheral edge.

6. The protective case of claim 5, wherein a protrusion is disposed on one of the outer peripheral edge and the second shell, and a groove is defined in the other of the outer peripheral edge and the second shell; the protrusion is engaged with the groove.

7. The protective case of claim 1, wherein the periphery of the body portion further comprises:
   a first transitional curved edge, disconnected to the rim portion;
   a second transitional curved edge, disconnected to the rim portion, wherein the first straight edge, the first transitional curved edge, the first edge, the second transitional curved edge, and the second straight edge are connected one after another; and
   wherein a line connecting two end points of the first edge is substantially perpendicular to the first straight edge or the second straight edge;
   wherein the rim portion is mounted on the first straight edge and the second straight edge, and terminated at the first straight edge and the second straight edge, such that the rim portion is disconnected to the top edge.

8. The protective case of claim 7, wherein the periphery of the body portion further comprises:
   a second edge, disposed opposite to the first edge, wherein a line connecting two end points of the second edge is substantially perpendicular to the first straight edge or the second straight edge; the rim portion is mounted on the first straight edge and the second straight edge without contacting with the second edge;
   a third transitional curved edge, connected between the first straight edge and the second edge, and disconnected to the rim portion; and
   a fourth transitional curved edge, connected between the second straight edge and the second edge, and disconnected to the rim portion.

9. The protective case of claim 7, wherein the second shell has a first end portion and a second end portion opposite to the first end portion; a distance from the first end portion to the first edge is shorter than a distance from the second end portion to the first edge; and
   a clearance groove is defined in the second shell at a position corresponding to an insulating portion of the mobile terminal, and the clearance groove extends through an edge of the first end portion; the clearance groove is configured to provide a clearance between the insulating portion and the protective case and provide a clearance between the slider and the protective case.

10. The protective case of claim 8, wherein a first opening is defined at one end of the rim portion that is adjacent to the first edge, and a second opening is defined at the other end of the rim portion adjacent to the second edge; and
    when the mobile terminal is mounted into the protective case, the slider protrudes out of the first opening.

11. The protective case of claim 10, wherein a maximum width of the first opening is greater than a maximum width of the second opening.

12. An electronic device, comprising
    a mobile terminal, comprising:
      a middle frame, comprising a pair of side end faces and a top end face connected between the pair of side end faces, wherein the top end face defines a receiving groove penetrating through the pair of side end faces;
      a slider, slidable relative to the middle frame, such that the slider is capable of extending out of or retracting into the receiving groove; and
      an electronic assembly, disposed in the slider; and
    a protective case, capable of being detachably sleeved at an outer side of the mobile terminal, the protective case comprising:
      a first shell, made of Kevlar and having a body portion and a rim portion, wherein the rim portion is fixed to a periphery of the body portion; and
      a second shell, made of polyurethane having a strength less than a strength of material of the first shell, wherein the second shell is fixed to an inner side of the rim portion that faces towards the body portion, such that a receiving space configured to receive the mobile terminal is defined by the first shell and the second shell,
      wherein the periphery of the body portion comprises:
        a first straight edge, connected to the rim portion;
        a second straight edge, disposed opposite to the first straight edge and connected to the rim portion; and
        a first edge, disposed between the first straight edge and the second straight edge and disconnected to the rim portion;
        wherein the first edge comprises a central region and two edge regions connected to two opposite ends of the central region; and the central region is recessed in a direction towards a middle of the body portion with respect to the two edge regions, such that a transmission area is formed by the central region and the edge regions;
      wherein when the protective case is sleeved at the outer side of the mobile terminal, the second shell is located between the rim portion and the mobile terminal; and the slider is slidable to extend out of the receiving space or retract into the receiving space; and
      when the slider retracts into the middle frame, the electronic assembly is hidden in the middle frame; when the slider extends out of the middle frame, the electronic assembly is exposed out of the protective case via the transmission area.

13. The electronic device of claim 12, wherein the rim portion defines a notch; a part of the second shell is embedded in the notch to form a button portion, and a cap is arranged on the button portion and disposed corresponding to a button of the mobile terminal; and the cap protrudes out of the notch;
    wherein a recess is defined in the cap and recessed from a side of the second shell that faces towards the receiving space to another side of the second shell that faces away from the receiving space; the recess has a configuration matching with that of the button; and when the protective case is sleeved at the outer side of the mobile terminal, the cap warps the button.

14. The electronic device of claim 13, wherein the button portion has a first outer surface facing away from the receiving space, and the rim portion has a second outer surface facing away from the receiving space; the first outer surface is spliced with the second outer surface; and
    the rim portion has an outer peripheral edge that is disconnected to the body portion, and the second shell wraps the outer peripheral edge.

15. The electronic device of claim 14, wherein the button portion comprises a carrying portion, and the cap is arranged on the carrying portion; a part of the carrying portion forming the first outer surface is substantially flush with the second outer surface.

16. The electronic device of claim 12, wherein the periphery of the body portion further comprises:
    a first transitional curved edge, disconnected to the rim portion;
    a second transitional curved edge, disconnected to the rim portion, wherein the first straight edge, the first transitional curved edge, the first edge, the second transitional curved edge, and the second straight edge are connected one after another;

a second edge, disposed opposite to the first edge, wherein a line connecting two end points of the second edge is substantially perpendicular to the first straight edge or the second straight edge;

a third transitional curved edge, connected between the first straight edge and the second edge, and disconnected to the rim portion; and a fourth transitional curved edge, connected between the second straight edge and the second edge, and disconnected to the rim portion;

wherein a line connecting two end points of the first edge is substantially perpendicular to the first straight edge or the second straight edge; and when the protective case is sleeved at the outer side of the mobile terminal, the rim portion is attached to the mobile terminal, wherein the slider is slidable relative to the first edge, the first transitional curved edge, and the second transitional curved edge.

17. The electronic device of claim 16, wherein the mobile terminal comprises a rear cover fixed to the middle frame, and the rear cover has a top edge facing towards the top end face; the top edge comprises an intermediate portion and two edge portions connected to two opposite ends of the intermediate portion; the intermediate portion is recessed in a direction toward a middle of the rear cover relative to the two edge portions; and the first edge of the protective case has a shape matching with that of the top edge.

18. The electronic device of claim 16, wherein the second shell has a first end portion and a second end portion opposite to the first end portion; a distance from the first end portion to the first edge is shorter than a distance from the second end portion to the first edge; and a clearance groove is defined in the second shell at a position corresponding to an insulating portion of the mobile terminal, and the clearance groove extends through an edge of the first end portion; the clearance groove is configured to provide a clearance between the insulating portion and the protective case and provide a clearance between the slider and the protective case.

19. The electronic device of claim 16, wherein a first opening is defined at one end of the rim portion that is adjacent to the first edge, and a second opening is defined at the other end of the rim portion adjacent to the second edge; and when the mobile terminal is mounted into the protective case, the slider protrudes out of the first opening.

20. The electronic device of claim 19, wherein a maximum width of the first opening is greater than a maximum width of the second opening.

* * * * *